(12) United States Patent  (10) Patent No.: US 7,920,199 B2
Kitsugi et al.  (45) Date of Patent: Apr. 5, 2011

(54) INFORMATION PROCESSING APPARATUS THAT OVERLAYS IMAGE INFORMATION WITH LINE-DRAWING INFORMATION

(75) Inventors: Yasuo Kitsugi, Saitama-ken (JP); Akira Ohmura, Kanagawa-ken (JP); Yousuke Kowno, Kanagawa-ken (JP)

(73) Assignee: Nikon Corporation, Tokyo (JP)

( * ) Notice: Subject to any disclaimer, the term of this patent is extended or adjusted under 35 U.S.C. 154(b) by 19 days.

(21) Appl. No.: 12/155,906

(22) Filed: Jun. 11, 2008

(65) Prior Publication Data

US 2008/0259049 A1 Oct. 23, 2008

Related U.S. Application Data

(63) Continuation of application No. 11/049,008, filed on Feb. 3, 2005, now abandoned, which is a continuation of application No. 09/631,032, filed on Aug. 2, 2000, now abandoned, which is a continuation of application No. 08/862,389, filed on May 23, 1997, now abandoned.

(30) Foreign Application Priority Data

May 24, 1996 (JP) .................................. 8-129556

(51) Int. Cl.
*H04N 5/222* (2006.01)
*H04N 5/76* (2006.01)
(52) U.S. Cl. ............ 348/333.02; 348/333.03; 348/231.6
(58) Field of Classification Search ............... 348/231.1, 348/231.6–231.9, 333.05, 333.11
See application file for complete search history.

(56) References Cited

U.S. PATENT DOCUMENTS

| 4,672,683 | A |   | 6/1987 | Matsueda et al. |   |
|---|---|---|---|---|---|
| 5,008,854 | A |   | 4/1991 | Maeda |   |
| 5,150,458 | A |   | 9/1992 | Masuzaki et al. |   |
| 5,239,419 | A |   | 8/1993 | Kim |   |
| 5,477,264 | A |   | 12/1995 | Sarbadhikari |   |
| 5,502,727 | A | * | 3/1996 | Catanzaro et al. | 370/271 |
| 5,526,023 | A | * | 6/1996 | Sugimoto et al. | 345/173 |
| 5,671,014 | A | * | 9/1997 | Ito et al. | 348/239 |
| 5,687,259 | A | * | 11/1997 | Linford | 382/294 |
| 5,689,742 | A | * | 11/1997 | Chamberlain, IV | 396/313 |
| 5,699,549 | A |   | 12/1997 | Cho |   |
| 5,731,852 | A | * | 3/1998 | Lee | 348/719 |

(Continued)

FOREIGN PATENT DOCUMENTS

GB 2 289 555 A 11/1995

(Continued)

*Primary Examiner* — Luong T Nguyen
(74) *Attorney, Agent, or Firm* — Oliff & Berridge, PLC

(57) ABSTRACT

An information processing apparatus provides improved expressive capability during presentations. Image, sound, memo information and other related input data that are recorded in an electronic camera are set to be reproduced in a predetermined order. When reproducing information that is set, images are displayed on a liquid crystal display that is part of an electronic camera and, in addition, similar images can be displayed on a separate monitor connected to the electronic camera. If it is desired to provide supplementary information during a presentation with the electronic camera, such supplementary information may be overlaid on any arbitrary section of the image being displayed using a pen type pointing device, for example. Furthermore, the supplementary overlaid information may be erased independently from other recorded information as needed because the supplementary information is stored in a different area of memory from the image and memo information.

22 Claims, 19 Drawing Sheets

| U.S. PATENT DOCUMENTS | | | | FOREIGN PATENT DOCUMENTS | | |
|---|---|---|---|---|---|---|
| 5,742,339 A | 4/1998 | Wakui | | JP | A-1-130272 | 5/1989 |
| 5,754,186 A | 5/1998 | Tam et al. | | JP | A-06-110424 | 4/1994 |
| 5,796,428 A | 8/1998 | Matsumoto | | JP | A-07-050798 | 2/1995 |
| 5,848,430 A | 12/1998 | Takakura et al. | | JP | A-07-200440 | 8/1995 |
| 5,862,218 A | 1/1999 | Steinberg | | JP | A-07-298196 | 11/1995 |
| 5,974,386 A | 10/1999 | Ejima et al. | | | | |
| 2002/0008763 A1 | 1/2002 | Kawamura et al. | | | | |

* cited by examiner

2x2 PIXEL AREA

|a|b|a|b|a|b|a|b|
|c|d|c|d|c|d|c|d|
|a|b|a|b|a|b|a|b|
|c|d|c|d|c|d|c|d|
|a|b|a|b|a|b|a|b|
|c|d|c|d|c|d|c|d|

CCD 20

FIG. 7

3x3 PIXEL AREA

|a|b|c|a|b|c|a|b|c|
|d|e|f|d|e|f|d|e|f|
|g|h|i|g|h|i|g|h|i|
|a|b|c|a|b|c|a|b|c|
|d|e|f|d|e|f|d|e|f|
|g|h|i|g|h|i|g|h|i|

CCD 20

FIG. 8

INFORMATION PROCESSING APPARATUS THAT OVERLAYS IMAGE INFORMATION WITH LINE-DRAWING INFORMATION

This is a Continuation of application Ser. No. 11/049,008 filed Feb. 3, 2005, which in turn is a Continuation of application Ser. No. 09/631,032 filed Aug. 2, 2000, which in turn is a Continuation of application Ser. No. 08/862,389 filed May 23, 1997. The entire disclosure of the prior applications is hereby incorporated by reference herein in its entirety.

INCORPORATION BY REFERENCE

The disclosure of the following priority application is herein incorporated by reference:
Japanese Application No. 08-129556, filed May 24, 1996.

BACKGROUND OF THE INVENTION

1. Field of Invention

The present invention relates to an information processing apparatus, in particular, an information processing apparatus which outputs image information.

2. Description of Related Art

In the past, an OHP (Over Head Projector), for example, was used in making a presentation. Such an OHP used light to project letters, drawings and other information written on a transparent sheet.

However, such an OHP as mentioned above could handle only letters and drawings, and lacked expressive capability.

Moreover, a pen which was used to write letters and drawings had ink which was difficult to erase once letters and drawings were written so that the contents of the writing were not easily erased. Hence, in a case when the same material was used repeatedly (in making repeated presentations), if some type of writing is made to supplement the contents which are written, the quality of the materials were gradually degraded because the contents of writing were not erasable.

SUMMARY OF THE INVENTION

Considering the problems described above, the present invention aims to improve the expressive capability of the information to be presented during a presentation, and to make it possible to write supplementary information freely without degrading the quality of the material, even when repeated presentations are made.

The information processing apparatus of embodiments of the invention includes a first memory that stores image information, a reproducing device that reproduces image information stored in the first memory, an input device that inputs line-drawing information, a second memory that stores the line-drawing information input by the input device, an overlay device that overlays the line-drawing information input with the input device and the image information reproduced by the reproducing device, and an output device that outputs an image signal corresponding to the information overlaid by the overlay device.

The information processing apparatus according to one embodiment of the invention inputs and stores the line-drawing information, overlays the image being stored on the line-drawing information that is input, and outputs the image signals that are overlaid. Image information may be freely written over with line-drawing information and displayed. Moreover, because the image and the line-drawing information are stored in separate areas, the line-drawing information that is written may be erased without affecting the underlying image, thus enabling repeated use of the image.

BRIEF DESCRIPTION OF THE DRAWINGS

The invention will be described in conjunction with the following drawings in which like reference numerals designate like elements and wherein:

FIG. 7 is a diagram showing a pixel skipping process in L-mode;

FIG. 8 is a diagram showing a pixel skipping process in S-mode;

DETAILED DESCRIPTION OF PREFERRED EMBODIMENTS

An embodiment of the present invention is described hereafter, with reference to the drawings.

Figure 1:
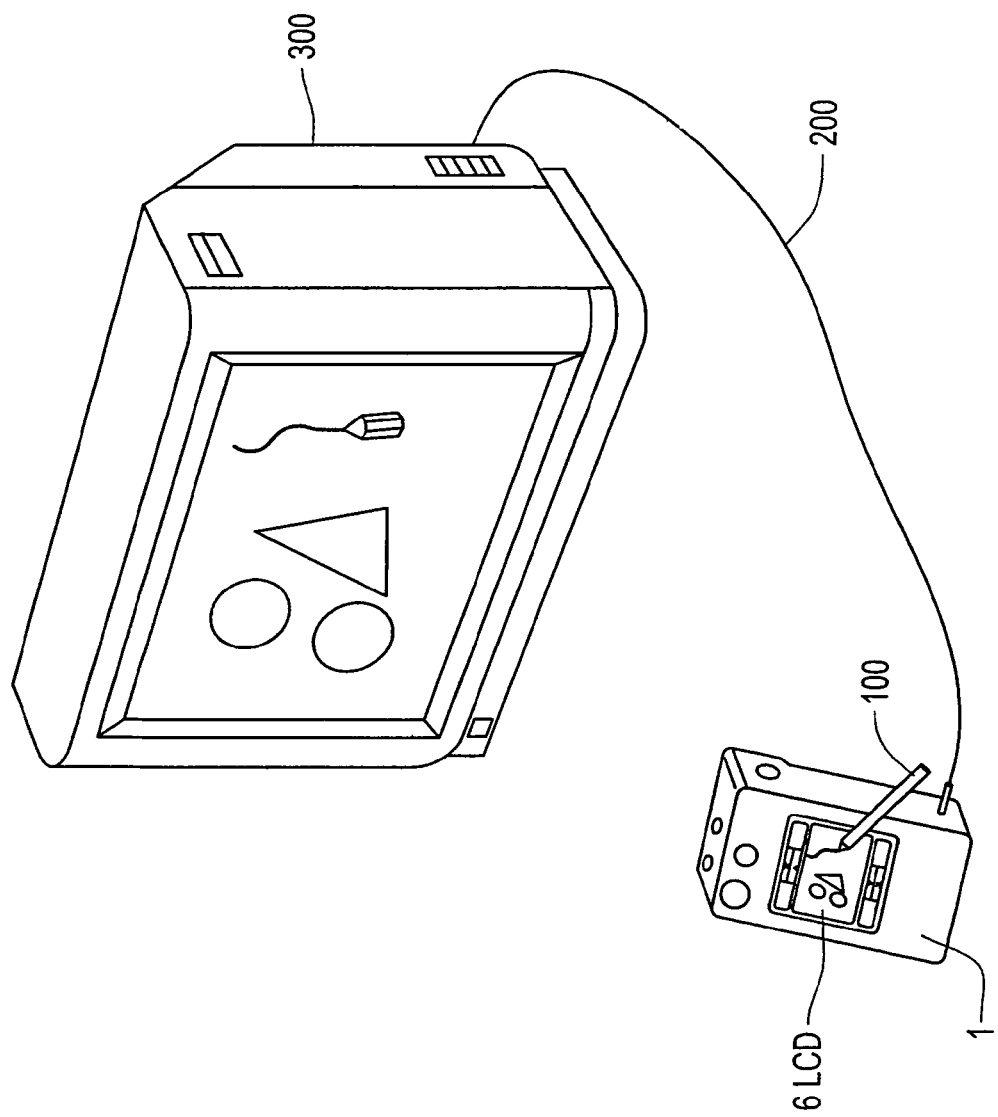
FIG. 1 is a perspective view showing an example of the structure of an electronic camera having an information processing apparatus according to an embodiment of the invention.

FIG. 1 is a drawing which shows an example of a structure of the electronic camera to which an embodiment of the present invention is applied. In FIG. 1, an electronic camera 1 records image, sound and memo information, and reproduces and outputs the information on an LCD (liquid crystal display) 6 or to an unrepresented speaker. The electronic camera 1 is connected to a monitor 300 through a connection cable 200, and is able to display the image being displayed on the LCD 6 to the monitor 300. A touch tablet (one example of an input device) to be explained later is provided on the surface of LCD 6. Line-drawing information may be input by pressing the touch tablet with a pen-type pointing device 100, which also is part of the input device. A cursor in the form of a pencil is displayed at a position on the monitor 300 which corresponds to the position designated by the pen type pointing device 100, enabling a user to confirm the current position of the pen type pointing device also on the monitor 300.

Figure 2:
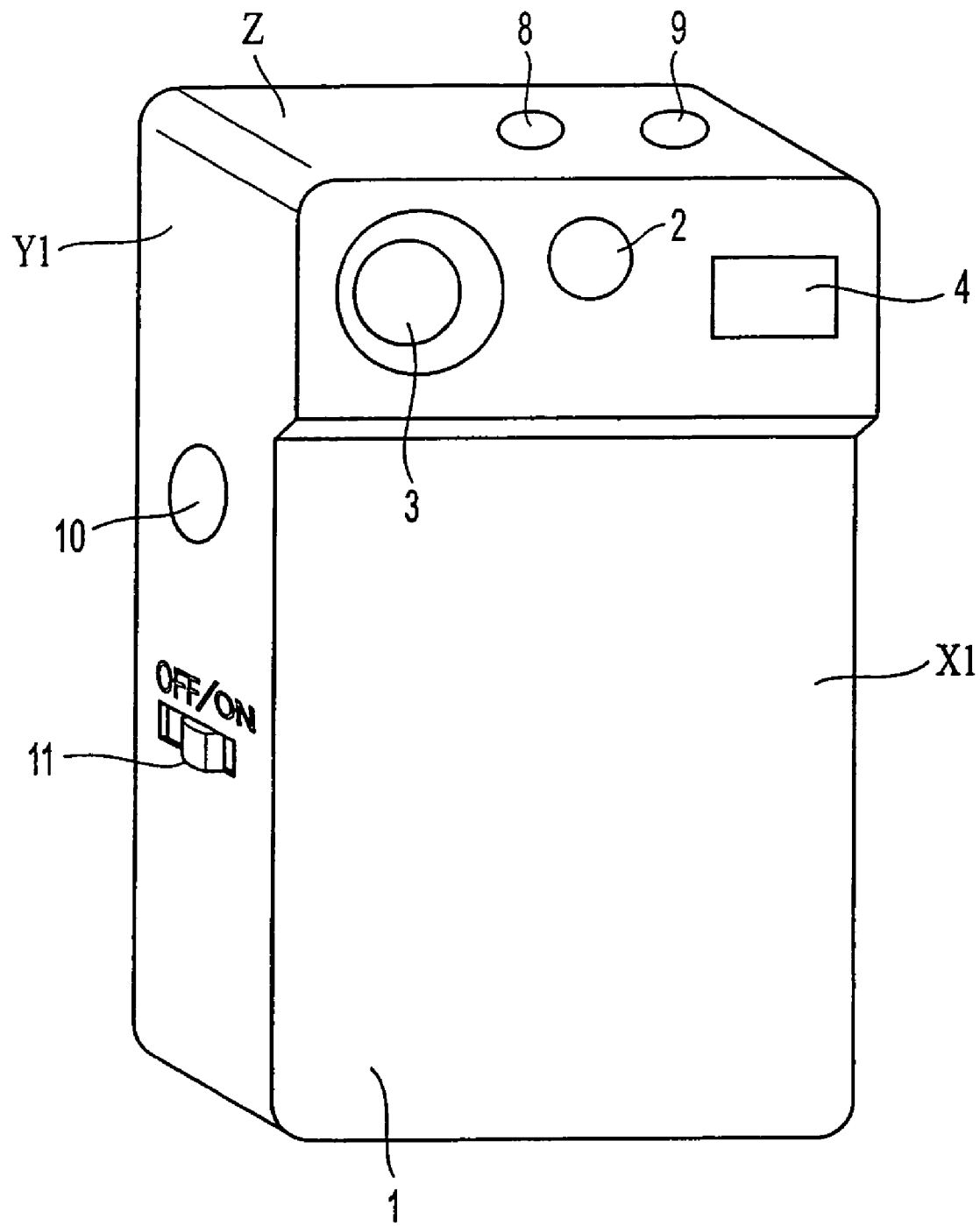
FIG. 2 is a perspective view from one side of the electronic camera of FIG. 1.
Figure 3:
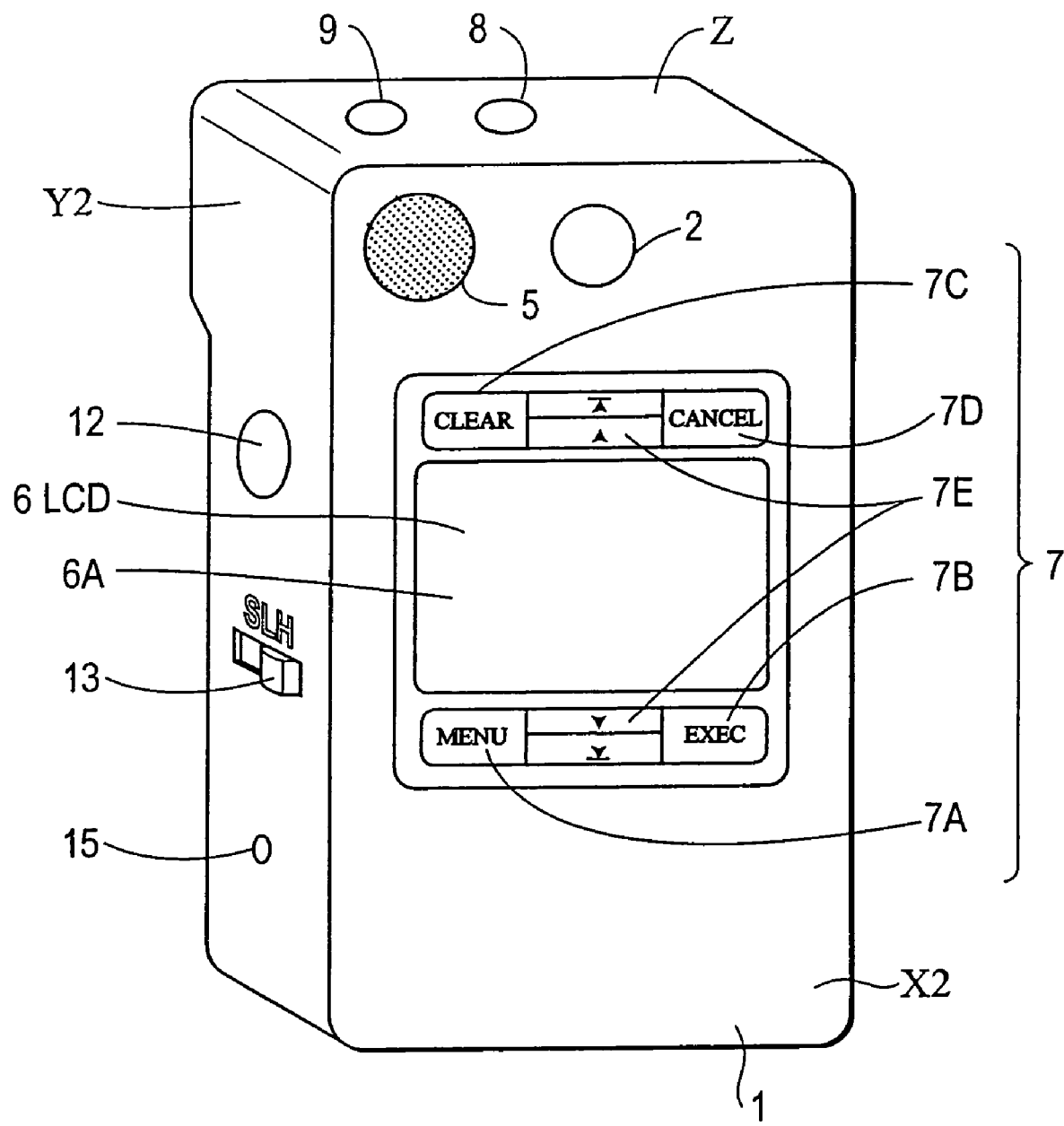
FIG. 3 is a perspective view from a side opposite to the side of FIG. 2.

FIG. 2 and FIG. 3 show examples of a configuration of an embodiment of an electronic camera having the features of the invention. The surface facing the object being recorded (i.e., the front of the camera) is defined as the surface X1 and the surface facing the user is defined as the surface X2. Provided on the top edge section of the surface X1, are a view finder 2 that is used to verify the shooting range of the object, a shooting lens 3 that takes in the optical image of the object and a light emitting unit (flash lamp) 4 that emits light to illuminate the object.

Provided on the top edge section of the surface X2 (a position corresponding to the top section of the surface X1 where the viewfinder 2, the shooting lens 3 and the light emitting unit 4 are formed), are the viewfinder 2 and a speaker 5 that outputs the sound being recorded in the electronic camera 1. The LCD 6 and the operation key 7 (which includes a menu key 7A, an execution key 7B, a clear key 7C, a cancel key 7D and a scroll key 7E) are formed in the surface X2 vertically below the viewfinder 2, the shooting lens 3, the light emitting unit 4 and the speaker 5. On the surface of the LCD 6, a touch tablet 6A is arranged which outputs position data corresponding to the position designated by the touching operation of a pen type pointing device, which will be explained later.

The touch tablet 6A is made of transparent material such as glass and resin so that the user can view an image being displayed on LCD 6 which is formed inside the touch tablet 6A through the touch tablet 6A.

The operation key 7 is a group of keys to be operated in reproducing and displaying recording data on LCD 6, and is formed of the following keys. In particular, the menu key 7A is a key to be operated when a menu screen is displayed on LCD 6. The execution key 7B is a key to be operated when recorded information selected by the user is reproduced. The clear key 7C is a key to be operated when recorded information is deleted. The cancel key 7D is a key to be operated when the reproducing process of recorded information is interrupted. A scroll key 7E is a key to be operated in scrolling the screen vertically when the recorded information is displayed on LCD 6 as a table.

A microphone 8 to gather sound and an earphone jack 9 to which an unrepresented earphone is connected are provided in the surface Z which is the top surface of the electronic camera 1.

A release switch 10 to be operated to shoot the object and a power source switch 11 are provided on the left side surface (surface Y1).

A recording switch 12 to be operated in sound recording and a continuous shooting mode switching switch 13 and a video signal output jack 15 to output video signals for the monitor 300 are provided in the surface Y2 (right surface) opposite from the surface Y1. The recording switch 12 is formed virtually at the same height so that the user does not feel the difference when the camera is held either by the right hand or the left hand.

Here, the height of the recording switch 12 and the release switch 10 may be intentionally made to be different so that the user does not accidentally press the switch provided in one side surface when the other switch provided in the opposite side surface is pressed and the user's fingers hold the one side surface to offset the moment created by the pressing of the switch.

The continuous shooting mode switching switch 13 is used when the user decides to shoot one frame or several frames of the object when shooting the object by pressing the release switch 10. For example, if the indicator of the continuous shooting mode switching switch 13 is pointed to the position "S" (in other words, when the switch is changed to the S mode), and the release switch 10 is pressed, the camera is made to shoot only one frame.

When the indicator of the continuous shooting mode switching switch 13 is pointed to the position "L" (in other words, when the switch is changed to the L mode), and the release switch 10 is pressed, the camera is made to shoot eight frames per second as long as the release switch 10 is pressed (namely, the low speed continuous shooting mode is enabled).

Furthermore, when the indicator of the continuous shooting mode switching switch 13 is pointed to the position "H" (in other words, when the switch is changed to the H mode), and the release switch 10 is pressed, the camera is made to shoot 30 frames per second as long as the release switch 10 is pressed (namely, the high speed continuous shooting mode is enabled).

Figure 4:
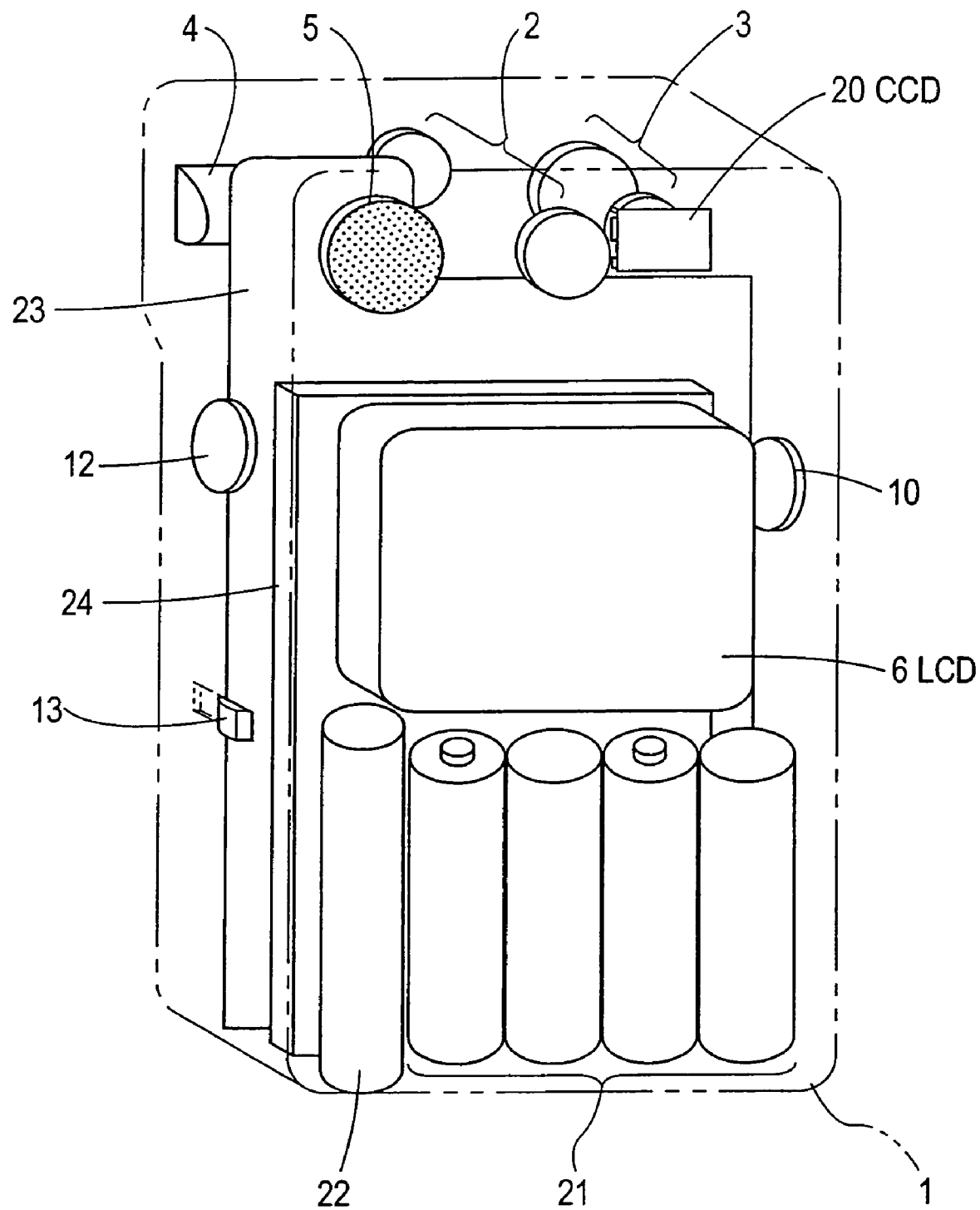
FIG. 4 is a perspective view showing internal structure of the electronic camera of FIG. 1.

Next, the internal structure of the electronic camera 1 will be described. FIG. 4 shows an example of the internal structure of the electronic camera shown in FIG. 2 and FIG. 3. The CCD 20 is provided in the rear part (surface X2 side) of the shooting lens 3 and the optical image of the object imaged through the shooting lens 3 is photo-electrically converted to electric signals by CCD 20.

Four cylindrical batteries 21 are placed side by side vertically below LCD 6 and the electric power generated by the batteries 21 is supplied to each part of the apparatus. A capacitor 22 is provided below LCD 6 and next to the batteries 21 to accumulate electric charge which is used to cause the light emitting unit 4 to emit light.

Various control circuits are formed on the circuit board 23 to control each part of the electronic camera 1. A removable memory card 24 (having a first memory, a second memory and a third memory) is provided between the circuit board 23, LCD 6 and the batteries 21 so that various information input into the electronic camera 1 can be recorded in pre-assigned areas of the memory card 24.

In the configuration of the present embodiment, the memory card 24 is made to be removable; but a memory in which various information can be recorded may be provided on the circuit board 23. Various information recorded in the memory (memory card 24) may be output to an external personal computer and the like through an unrepresented interface.

Figure 5:
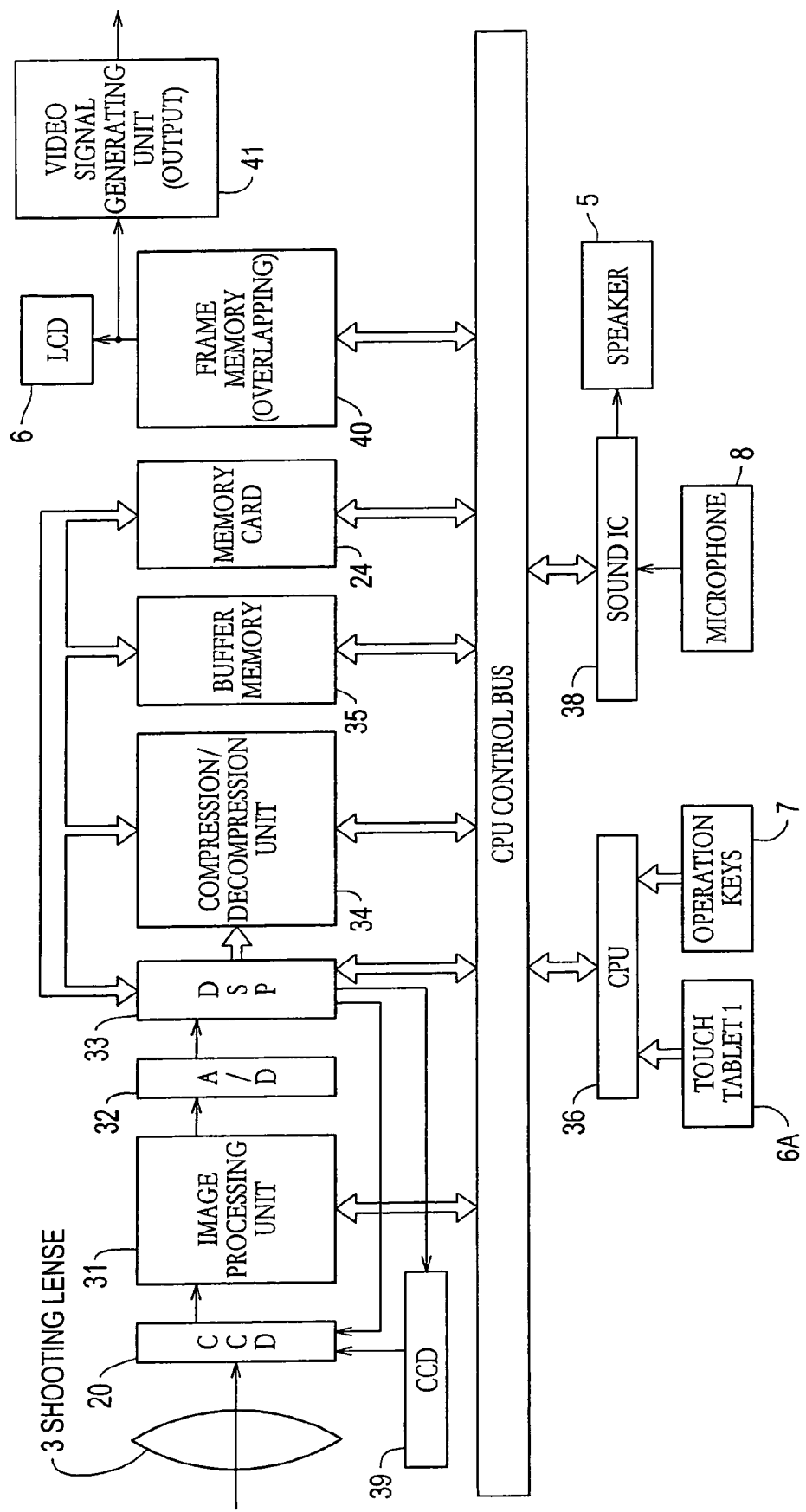
FIG. 5 is a block diagram showing an electrical structure of the electronic camera of FIG. 1.

An example of an internal electric structure of the electronic camera of the configuration of the present embodiment will be described hereafter, with reference to a block diagram of FIG. 5. CCD 20 which is equipped with a plurality of pixels photo-electrically converts the optical image imaged on each pixel into image signals (electric signals). The CCD driving unit 39 is controlled by the DSP 33 and drives CCD 20.

The image processing unit 31 performs a double correlation sampling on image signals photo-electrically converted by the CCD 20 at a predetermined timing, and optimizes the signal values of the image signals which are sampled using the auto gain control. An analog/digital conversion circuit (hereafter, A/D conversion circuit) digitizes and supplies the image signals which are sampled by the image processing unit 31 to a digital signal processor (hereafter referred to as DSP) 33.

DSP 33 executes a predetermined process, which will be explained later, on the digitized image signals and supplies the results to the compression/decompression unit (the reproducing device). The compression/decompression unit 34 compresses the image signals supplied from DSP 33 and outputs the compressed signals to CPU 36. CPU 36 controls the storage of image signals which are digitized and compressed (hereafter, shooting image data) into a predetermined area (image area) of the memory card 24, which will be explained later.

Figure 6:
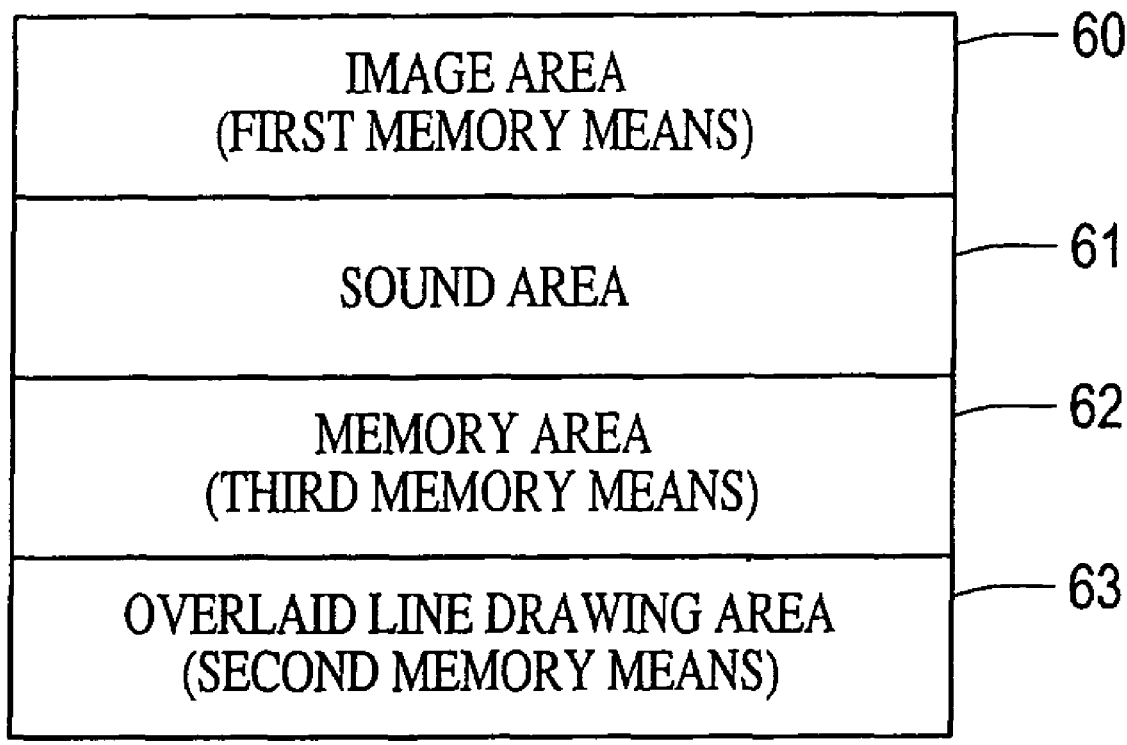
FIG. 6 is a diagram showing one configuration of division of area in the memory card of FIG. 5.

FIG. 6 shows a configuration of the division of the storage area in the memory card 24. The image area (first memory) 60 is an area where the shooting image data is stored, and the sound area 61 is an area where sound data is stored. The second memory 62 is an area where the line-drawing information input by the pen type pointing device is recorded. An overlaid line-drawing area (third memory) 63 is an area where overlaid line-drawing data (to be explained later) is recorded.

CPU 36 is equipped with an unrepresented clock circuit and is made to record shooting date information as header information Nor the image data in the image area 60 of the memory card 24 (in other words, the shooting image data to be recorded in the memory card 24 includes the shooting date).

A microphone 8 inputs sound (gathers sound), converts the sound to corresponding electric signals and supplies the results to a sound IC (integrated circuit) 38. The sound IC 38 A/D-converts the sound signal being input, executes the compression process by means of ADPCM (adaptive differential pulse code modulation), and supplies the results to CPU 36 through a CPU control bus.

CPU 36 records the sound data which is compressed after being digitized in the sound area 61 of the memory card 24 through the CPU control bus. The recording date data is recorded at this time as the header information of the sound data in the sound area 61 of the memory card 24.

When the touch tablet 6A is pressed by the pen type pointing device 100 operated by the user, CPU 36 reads the X-Y coordinates of the pressed position in the touch tablet 6A and accumulates the coordinate data in the buffer memory 35. CPU 36 records the accumulated coordinate information with the header information of the information input date as memo information in the memory area 62 of the memory card 24.

LCD 6 is connected to CPU 36 through a frame memory 40 (which functions as an overlay means and as an output means), enabling image display. However, the shooting image data that is compressed is temporarily input to the compression/decompression unit 34 and decompressed before the data is supplied to the frame memory 40.

The video signal generation unit 41 (which also functions as the output means) generates video signals from the image data being stored in the frame memory 40 and outputs the signals to the external monitor 300 through the video signal output jack 15 (see FIG. 3).

Digital/analog conversion (hereafter D/A conversion) is performed on the sound data which is output from the memory card 24 and is converted to analog signals, after which the signals are supplied to the speaker and are output as sound.

The operation of the present embodiment is described next.

To begin with, an input/output process (however, an input/output process of sound information only) of the present apparatus will be described.

When the recording switch 12 which is provided in the surface Y2 is pressed after power is introduced to the electronic camera 1 by the operation of power switch 11, the recording of sound information (input process of sound information) is started. Sound information is input through the microphone 8 and after A/D conversion and compression processes are executed by the sound IC 38, the results are supplied to CPU 36.

The sound data supplied to the CPU 36 is supplied to the memory card 24 and is recorded in the sound memory area 61. At this time, the recording date data is recorded in the sound area 61 of the memory card 24 as the header information of the compressed sound data. This operation is executed continuously as long as the recording switch 12 is pressed.

Here, the sound information is compressed by the ADPCM method, but other compression methods may also be used.

Next, the operation of an embodiment of the invention during shooting will be described.

First, the case in which the continuous shooting mode switching switch 13 that is provided in the surface Y2 is switched to the S-mode (a mode in which only one frame is shot) is described. To begin with, the user operates the power source switch 11 which is provided in the surface Y1 to introduce electric power to the electronic camera 1. After verifying the object through the viewfinder 2, the user presses the release switch 10 that is provided in the surface Y1, thereby beginning the shooting process of the object.

The light image of the object which is observed by the viewfinder 2 is gathered by the shooting lens 3 and is imaged on CCD 20, which comprises a plurality of pixels. The light image of the object imaged on CCD 20 is photo-electrically converted to an image signal by each pixel and is sampled by the image processing unit 31. The image signal which is sampled by the image processing unit 31 is supplied to the A/D conversion circuit 32 where it is digitized and is output to DSP 33.

DSP 33 performs a process to generate color difference signals from the RGB (red, green, blue) signal and a gamma process which is a non-linear process. The compression/decompression unit 34 compresses the image data which is supplied by the DSP 33 according to the JPEG (Joint Photographic Experts Group) method that is a combination of discrete cosine transformation, quantization and Huffman encoding, and outputs it to the CPU 36. CPU 36 records the shooting image data that is digitized and compressed into the image area 60 of the memory card 24 through a CPU control bus. At this time, the shooting date data is recorded in the image area 60 of the memory card 24 as header information.

Here, in the case when the continuous shooting mode switching switch 13 is switched to the S-mode, only one frame is shot, and even if the release switch 10 is continuously pressed, shooting does not take place beyond one frame and the image that is shot is displayed on LCD 6.

Next, the case is described in which the continuous shooting mode switching switch 13 is switched to the L-mode (a mode in which 8 frames are shot per second). The user operates the power source switch 11 provided in the surface Y1 to introduce electric power to the electronic camera 1. Then the user presses the release switch 10 provided in the surface Y1, which begins the shooting process of the object.

The light image of the object which is observed by the viewfinder 2 is gathered by the shooting lens 3 and is imaged on CCD 20, which comprises a plurality of pixels. The light image of the object imaged on CCD 20 is photo-electrically converted to an image signal by each pixel and is sampled eight times per second by the image processing unit 31. At this time, the image processing unit 31 samples one fourth of all the pixels in CCD 20. In other words, the image processing unit 31 divides the pixels in CCD 20 which are arranged in a matrix into areas comprising 2×2 pixels (4 pixels), as shown in FIG. 7, and samples the image signal of one pixel which is located at a predetermined position in each area. The remaining 3 pixels are skipped.

For example, during the first sampling (first frame), the pixel a, which is located on the left upper corner of each base unit, is sampled and other pixels b, c and d are shipped. During the second sampling (second frame), the pixel b, which is located on the right upper corner or each base unit, is sampled and other pixels a, c and d are skipped. Likewise, during the third and the fourth sampling, the pixels c and d, which are respectively located at the left lower corner and the right lower corner, are sampled and the rest are skipped. In short, each pixel is sampled once during four samplings.

The image signals (image signals of one fourth of all the pixels in CCD 20) that are sampled by the image processing unit 31 are supplied to the A/D conversion circuit 32 where they are digitized and output to DSP 33.

DSP 33 performs the aforementioned process on the digitized image signals and outputs to the compression/decompression unit 34. The compression/decompression unit 34 performs a compression process based on the JPEG method on the image signals and supplies them to CPU 36. CPU 36 records digitized and compressed image data in the image area 60 of the memory card 24 through CPU control bus. At this time, the shooting date data is recorded as the header information of the shooting image data in the image area 60 of the memory card 24.

Thirdly, the case is described in which the continuous shooting mode switching switch 13 is switched to the H-mode (a mode in which 30 frames are shot per second). The user operates the power source switch 11 provided in the surface Y1 to switch the power source of the electronic camera 1 to the on-mode. Then the user presses the release switch 10 in the surface Y1, which begins the shooting process of the object.

The light image of the object which is observed by the viewfinder 2 is gathered by the shooting lens 3 and is imaged on CCD 20, which comprises a plurality of pixels. The light image of the object imaged on CCD 20 is photo-electrically converted to an image signal by each pixel and is sampled 30 times per second by the image processing unit 31. At this time, the image processing unit 31 samples one ninth of all the pixels in CCD 20. In other words, the image processing unit 31 divides the pixels in CCD 20 which are arranged in a matrix into areas comprising 3×3 pixels (9 pixels) as shown in FIG. 8, and samples, 30 times per second, the image signal of one pixel which is located at a predetermined location in each area. The remaining 8 pixels are skipped.

For example, during the first sampling (first frame), the pixel a, which is located on the left upper corner of each base unit, is sampled and other pixels b through i are skipped. During the second sampling (second frame), the pixel b, which is located on the right of pixel a, is sampled and other pixels a and c through i are skipped. Likewise, during the third and the fourth sampling, the pixel c, d, . . . are sampled, respectively, and the rest are skipped. In short, each pixel is sampled once for every nine frames.

The image signals (image signals of one ninth of all the pixels in CCD 20) that are sampled by the image processing unit 31 are supplied to the A/D conversion circuit 32 where they are digitized and output to DSP 33.

DSP 33 performs the aforementioned process on the digitized image signals and outputs to the compression/decompression unit 34, which performs compression processing based on the JPEG method on the image signals and outputs the result to CPU 36.

CPU 36 adds the shooting date data to the digitized and compressed image data and records the results in the image area 60 of the memory card 24.

Next, the operation in which two dimensional memo information is input from the touch tablet 6A will be described. When the touch tablet 6A is pressed by the tip of the pen of the pen type pointing device 100, the X-Y coordinate of the contact point is supplied to CPU 36. The X-Y coordinate is accumulated in the buffer memory 35. Moreover, CPU 36 writes bit data on the address in the frame memory 40 which corresponds to the X-Y coordinate. As a result, a bit pattern is displayed at the corresponding location in LCD 6.

As described above, the touch tablet 6A formed on the surface of LCD 6 is made of transparent material. The user is able to view the bit pattern being displayed on the LCD 6, which gives the impression that the input is made by the pen directly onto LCD 6. Moreover, when the pen type pointing device 100 is moved on the touch tablet 6A, a line tracing the motion of the pen type pointing device 100 is displayed on LCD 6. If the pen type pointing device 100 is moved intermittently on the touch tablet 6A, a dotted line tracing the motion of the pen type pointing device 100 is displayed on LCD 6. In this manner, the user is able to input memo information of desired letters, drawings and the like from the touch tablet 6A.

When the memo information is input by the pen type pointing device 100 when the shooting image is already displayed on LCD 6, the memo information or overlaid line-drawing information is synthesized with the shooting image information by the frame memory 40 and they are displayed together on LCD 6.

By operating an unrepresented color selection switch, the user can choose the color of the line drawing to be displayed on LCD 6 from black, white, red, blue and others, for example.

If the execution key 7B of operation key 7 is pressed after memo information is input to the touch tablet 6A by the pen type pointing device 100, the memo information accumulated in the buffer memory 35 is supplied with the header information of input date to the memory card 24 through the CPU control bus and is recorded in the memory area 62.

In the described example, the memo information recorded in the memory card 24 is compressed information. The memo information input to the touch tablet 6A contains information with a high spatial frequency component. Hence, if the aforementioned JPEG method is used for compression of memo information, the compression efficiency becomes poor and the amount of information is not reduced, resulting in a longer time for compression and decompression. Moreover, compression by the JPEG method is non-reversible compression, hence it is not suitable for the compression of memo information with a small information amount. (This is because image distortions due to missing information become noticeable when information is decompressed and displayed on LCD 6.)

Hence, in the present embodiment, memo information is compressed using the run length method, which is used in facsimile machines and the like. The run length method is a method in which memo information is scanned in the horizontal direction and memo information is compressed by symbolizing the continuous length of the information of each color such as black, white, red and blue as well as the continuous length of non-information (where there is no pen input).

Using the run length method, memo information is effectively compressed and the control of missing information becomes possible even when the compressed memo information is decompressed. Moreover, it is possible to prevent memo information from being compressed if the information amount is relatively small.

If the memo information is input by the pen type pointing device 100 when the shooting image is already displayed on LCD 6, the memo information is synthesized with the shooting image information by the frame memory 40 and they are displayed together on LCD 6. On the other hand, the shooting image data is recorded in the image area 60 of the memory card 24 and the memo information is recorded in the memory area 62 of the memory card 24. In this manner, two types of information are recorded in different areas, hence, the user may be able to erase one of the two types (line drawing, for example) from the synthesized images of shooting image and line drawing, enabling further compression of each image information by a separate compression method.

In the aforementioned embodiment, the memo information (information created by line drawing) input by the pen type pointing device 100 is recorded after the execution of a predetermined process, but a table of letters such as the alphabet or hiragana (Japanese character) may be displayed on LCD 6 as a table, for example, and a character string designated by the user may be recorded as memo information.

If data is recorded in the image area 60, the sound area 61 or the memory area 62 of the memory card 24, a predetermined display is executed in LCD 6. In a display example of FIG. 9, the date of the recording information (recording date) (Aug. 25, 1995, in this case) is displayed at the bottom of each screen with the recording time of the information recorded on that date being displayed at the left end of the screen.

To the right of the time of recording, a memo symbol (□) is displayed. This symbol indicates that the memo information has been recorded. A thumb nail image is displayed on the right of the memo symbol. The thumb nail image is formed by skipping (reducing) the bit map data of each image data of the shooting image data recorded in the memory card 24. Information with this display is information containing the shooting image information. In other words, information recorded (input) at "10:16", "10:21", and "10:54" contain the shooting image information, but information recorded at "10:05", "10:28" and "13:10" do not contain shooting image information.

An overlaid line-drawing information symbol (○) is displayed to the right of the thumb nail image. The overlaid line-drawing information symbol will be explained later.

A sound information bar is displayed to the right of the overlaid line-drawing information symbol and a bar (line segment) with the length corresponding to the time length is displayed (the bar is not displayed if the sound information is not input).

Figure 9:
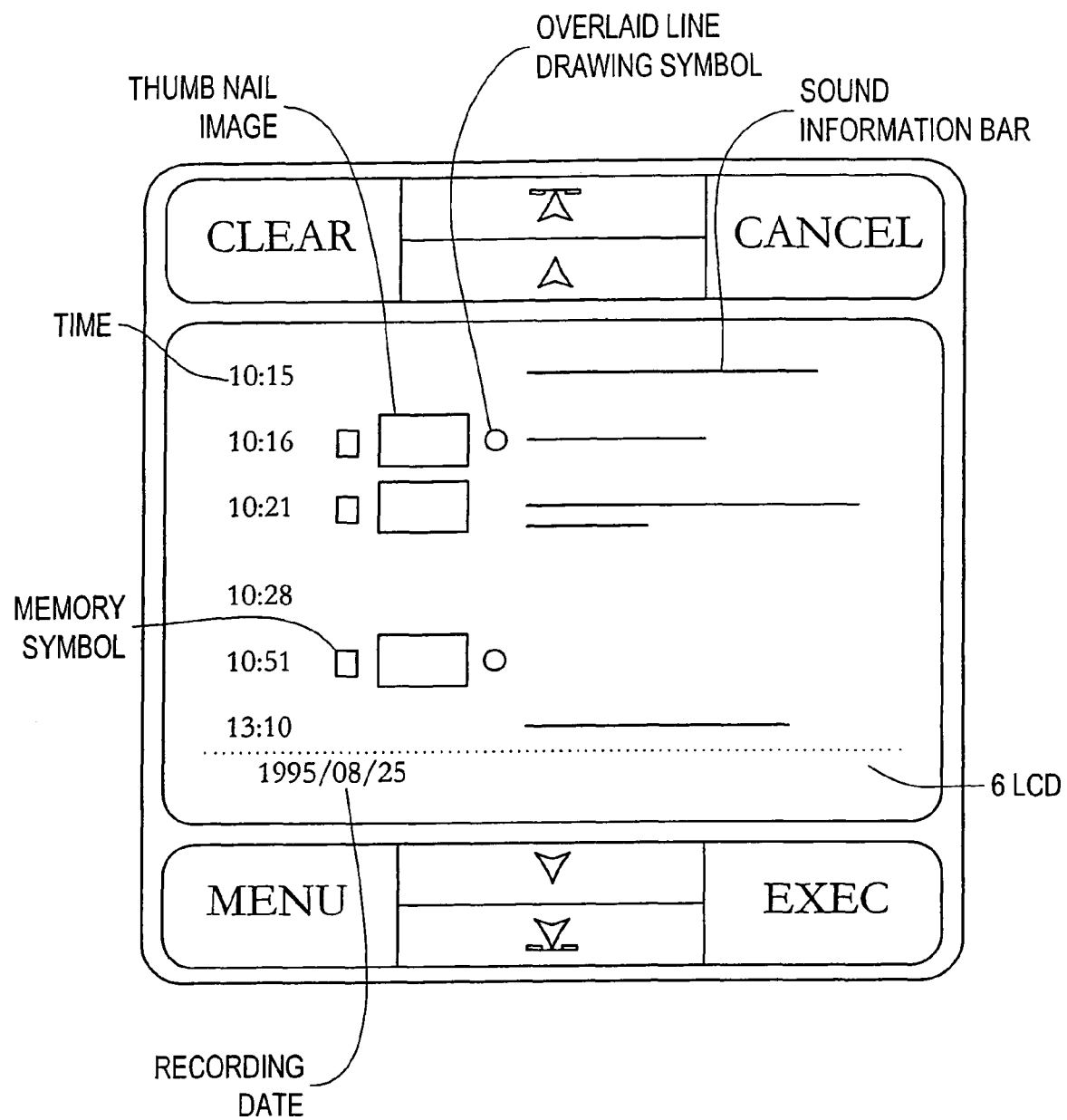
FIG. 9 is a diagram showing a display example on the screen when reproducing the recorded information.

The user selects and designates information to be reproduced by pressing, with the tip of the pen type pointing device 100, any of the above-described parts in the display line of the desired information in LCD 9 as shown in FIG. 9. The selected information is reproduced by pressing, with the tip of the pen type pointing device 100, the execution key 7B as shown in FIG. 3.

For example, if the sound information bar at "10:05", as shown in FIG. 9, is pressed by the pen type pointing device 100, the CPU 36 reads sound data corresponding to the selected recording date and time (10:05) from the sound area 61 of the memory card 24 and supplies the sound data to the sound IC 38. The sound IC 38 executes the decompression process to the sound data (compressed sound data), executes D/A conversion to convert the data to analog signals, and supplies the analog signals to the speaker 5. The speaker 5 converts the analog signals being supplied to the sound and outputs the sound. If an unrepresented ear phone is connected to the ear phone jack 9, the sound is not reproduced from the speaker 5 but is reproduced from the unrepresented ear phone.

In reproducing the shooting image data recorded in the memory card 24, the user selects the information by pressing the desired thumb nail image with the tip of the pen type pointing device 100, and then reproduces the selected information by, pressing the execution key 7B.

CPU 36 reads the shooting image data corresponding to the selected shooting data from the image area 60 of the memory card 24 and supplies the shooting image data to the compression/decompression unit 34. The shooting image data (compressed shooting data) supplied to the compression/decompression unit 34 is decompressed there and is output again to CPU 36. CPU 36 temporarily accumulates the shooting image data as bit map data in the frame memory 40 and then displays the shooting image data on LCD 6.

The image shot in the S-mode is displayed as a still image on LCD 6. This still image is lithe image reproduced from the image signals of all the pixels in CCD 20.

The image shot in the L-mode is displayed continuously at 8 frames per second on LCD 6. In this case, the number of pixels being displayed in each frame is one fourth of all the pixels in CCD 20.

Human vision is sensitive to deterioration of resolution of the still image, hence the user may easily detect any skipping of the pixels in the still image. However, in L-mode where images of 8 frames are reproduced per second, the number of pixels in each frame becomes one fourth of the total number of pixels of CCD 20, but information amount per unit time doubles compared to the still image because images of 8 frames are reproduced per second as described before. In other words, assuming the number of pixels of one frame of the image shot with S-mode to be one, the number of pixels in one frame of the image shot with L-mode becomes one fourth. When the image (still image) shot with S-mode is displayed oh LCD 6, the amount of information viewed by the human eye per second is 1=((number of pixels 1)×(number of frames 1)). On the other hand, when the image shot with L-mode is displayed on LCD 6, the amount of information viewed by the human eye per second is 2=((number of pixels ¼)×(number of frames 8)). In other words, twice as much information is viewed by the human eye. Hence, even when the number of pixels in one frame is reduced to one fourth, it is difficult for the user to notice the deterioration of the image quality during reproduction.

Moreover, in the present embodiment, different sampling is executed for each frame and the sampled pixels are displayed on LCD 6. Hence, after-image effect occurs in the human eve and the user may be able to view the image shot with L-mode and displayed on LCD 6 while not noticing the deterioration of the image, even when three fourths of the pixels are skipped per frame.

The image shot with H-mode is displayed on LCD 6 at a rate of 30 frames per second. At this time, the number of pixels displayed in each frame is one ninth of the total number of the pixels of CCD 20 but the user can view the image shot with H-mode and displayed on LCD 6 while not noticing deterioration of image quality for the same reason as in the case of the L-mode.

In the present embodiment, when the object is shot with the L-mode or the H-mode, because the image processing unit 31 is made to skip the pixels in CCD 20 in such a manner that the user does not notice the deterioration of the image quality during reproduction, the load on DSP 33 and the compression/decompression process unit 34 is reduced, and low-speed and low-power operation of these units is possible. Moreover, low-cost and low-energy consumption operation of the apparatus is enabled.

Next, the operation of an embodiment during presentation mode will be described.

Figure 10:
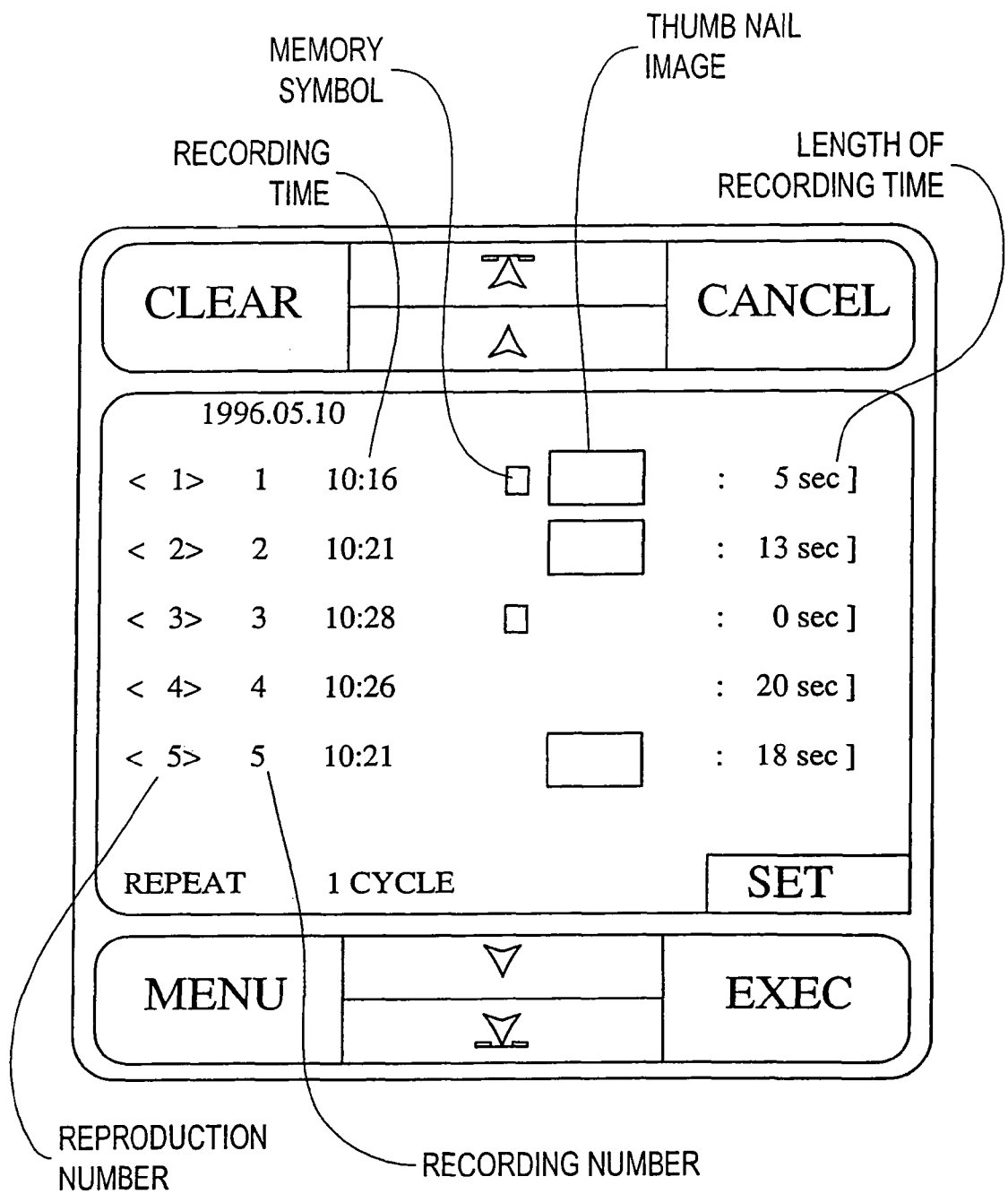
FIG. 10 is a diagram showing a display example of the initial screen of the presentation mode.

FIG. 10 is a display example of the initial screen (a screen to verify the contents of settings) for reproducing information such as recorded sound, image and memo with presentation mode. In this figure, the reproduction number on the left edge of the screen represents the order of reproduction during the execution of the presentation mode. The recording number to the right represents the order of recording of the information. Recording time represents the time at which each information is recorded. The memo symbol (□) indicates that the information contains the memo information and the thumb nail image indicates that the image information is contained. The recording time represents the length of the sound information and the value becomes "0" when the sound information is not recorded. The repeating number indicates the number of times reproduction is repeated when the presentation mode is executed.

In the present example, the number "1996.05.10" being displayed on the left top corner of the screen represents the recording date. In the case of the embodiment shown in FIG. 10, it indicates that all the data are recorded on that date. The recording date is displayed when the recording date of the data in a certain row differs form the recording date of the data being displayed on the row immediately above (as viewed in FIG. 10). Hence, if only the fourth data is recorded on "1996.05.22", "1996.05.22" is displayed on the row preceding the fourth row of the data (data whose recording date is different from the data in the row immediately above), and "1996.05.10" is displayed on the fifth row following the fourth row of the data (because the recording date of the fifth data is different from the recording date of the fourth data).

Figure 11:
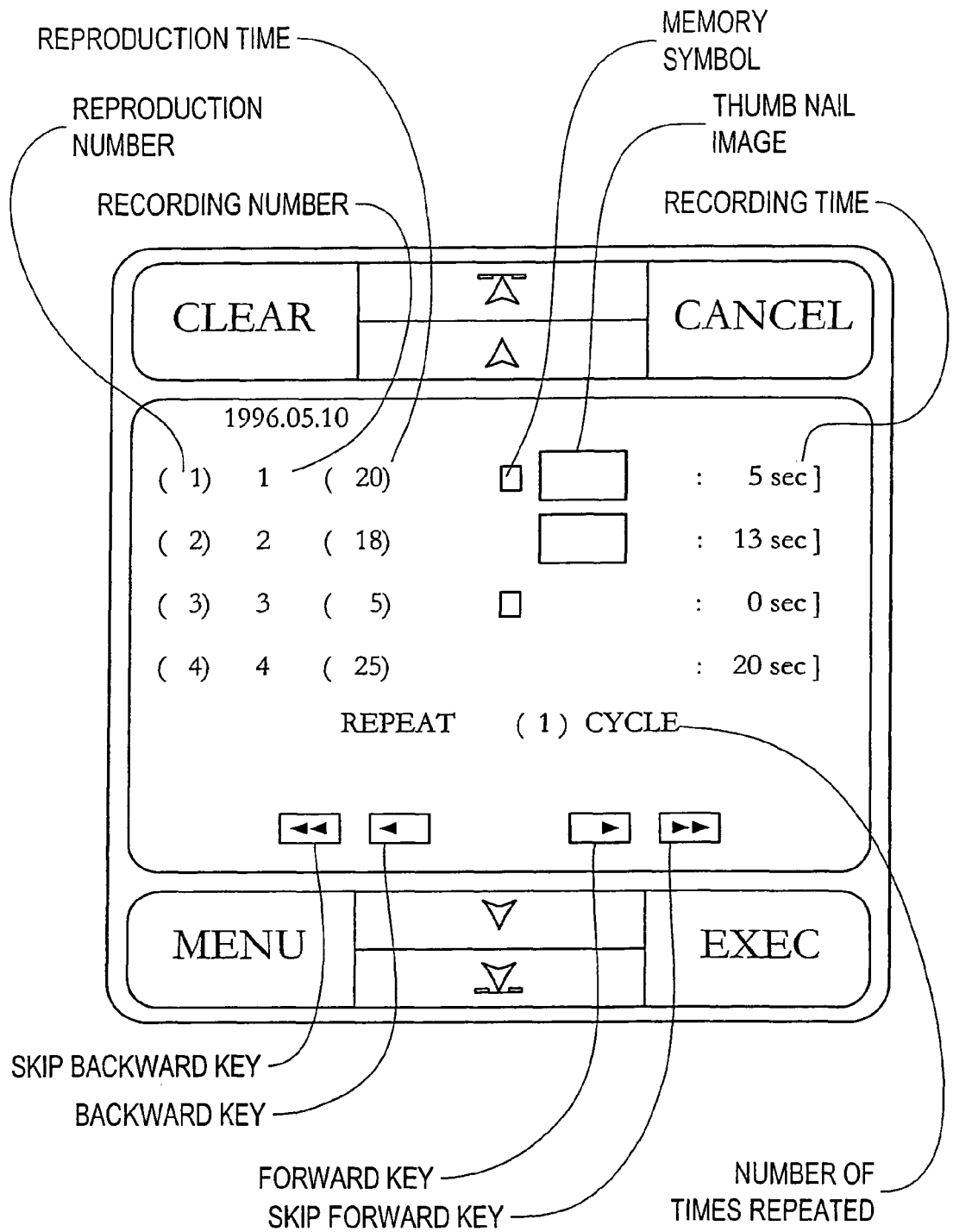
FIG. 11 is a diagram showing a display example of the setting screen of the presentation mode.

When the user presses the section indicated by "SET" at the right bottom corner of the screen with the pen type pointing device 100, the screen will move to the setting screen of FIG. 11.

FIG. 11 illustrates a display example of the setting screen which sets the presentation mode. The reproduction number, reproduction time and repeating number are set to desired values by a skip forward key, a forward key, a backward key and a skip backward key shown in the bottom of the figure.

Here, the initial value of the reproduction time is made to be the recording time plus "5" seconds. This is to secure a certain, minimum display time (5 seconds) in reproducing information which does not contain sound, for example, (information formed of only image and memo information).

Suppose the setting value of the data displayed second is to be changed. First, the user presses, with the pen type pointing device 100, the part where the second data is displayed. Then, the part is reverse displayed, indicating that the setting value can be changed. When the user presses again the part where the numerical value to be changed is displayed, the part is again reverse displayed (returns to original display). Then, the numerical values of the skip forward key, the forward key, the backward key, and the skip backward key that are displayed on the bottom can be changed by pressing these keys with the pen type pointing device 100.

Here, when the skip forward key and the forward key are pressed once, the designated values are increased by "5" and "1" respectively. When the skip backward key and the backward key are pressed, the designated values are decreased by "5" and "1" respectively. The reproduction time cannot become negative, hence, it is desirable to make some adjustment so that the reproduction time does not become smaller than a certain value.

In the display example of FIG. 11, only the data recorded on "11996.05.10" is displayed, but data recorded before or after this date may be displayed by pressing the scroll key 7E. Hence, it becomes possible to combine data with different recording dates and reproduce them with the presentation mode.

When the execution key 7B is pressed with the pen type pointing device 100 in this screen, reproduction of the data which is set begins.

Figure 12:
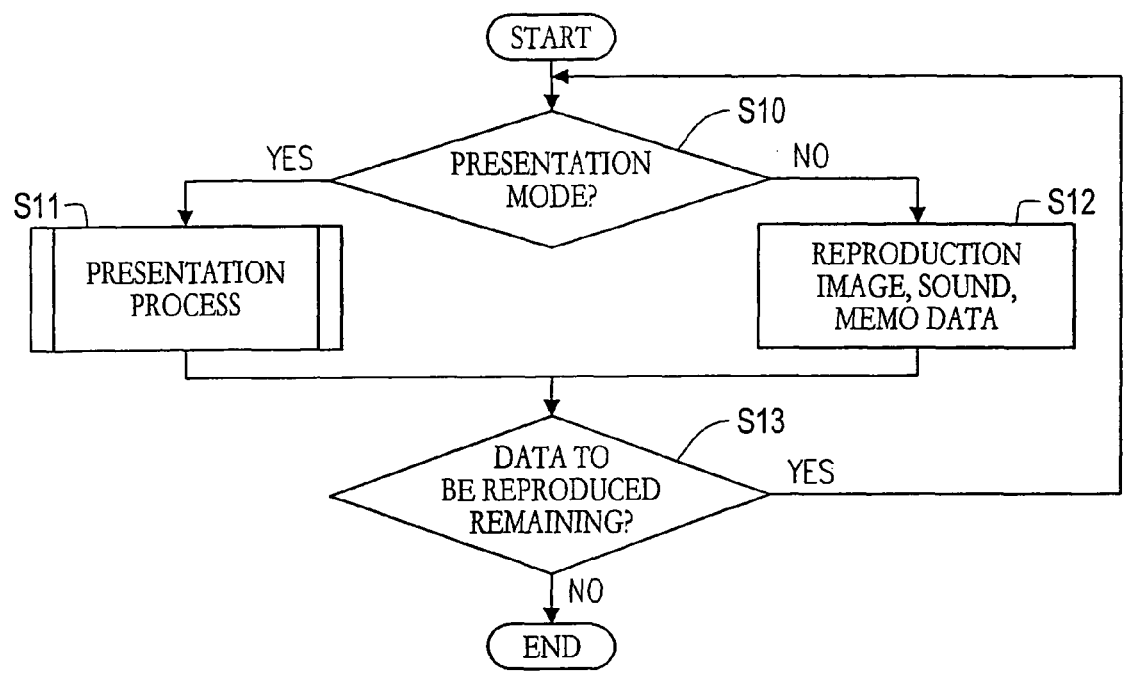
FIG. 12 is a flow chart showing an example of the process to reproduce recorded information.

FIG. 12 is a flow chart describing an example of the process of reproducing the recorded information (reproduction process by the presentation mode or the playback mode).

This process is executed when the execution key 7B is pressed in the setting screen of the playback mode (mode to reproduce information recorded without executing the overlaid line-drawing process to be explained later) or in the setting screen of the presentation mode.

When this process is executed, CPU 36 determines whether the execution key 7B is pressed in the setting screen of the presentation mode at step S10. As a result, if CPU 36 makes a negative determination (NO), or equivalently the execution key 7B is determined to be pressed in the setting screen of the playback mode, CPU 36 moves to step S12, begins reproduction of first recording data, and moves to step S13.

If CPU 36 makes an affirmative determination (YES), or equivalently, the execution key 7B is pressed in the setting screen of the presentation mode, CPU 36 moves to step S11, executes the presentation process, and moves to step S13. Here, the process in step S11 is a sub-routing, details of which will be described later.

At step S13, CPU 36 determines if there are any data left to be reproduced. As a result, if CPU 36 determines that there are data to be reproduced (YES), CPU 36 returns to step S10 and repeats the similar process. Moreover, if CPU 36 determines that there is no data to be reproduced (NO), the process is completed (End).

Figure 13:
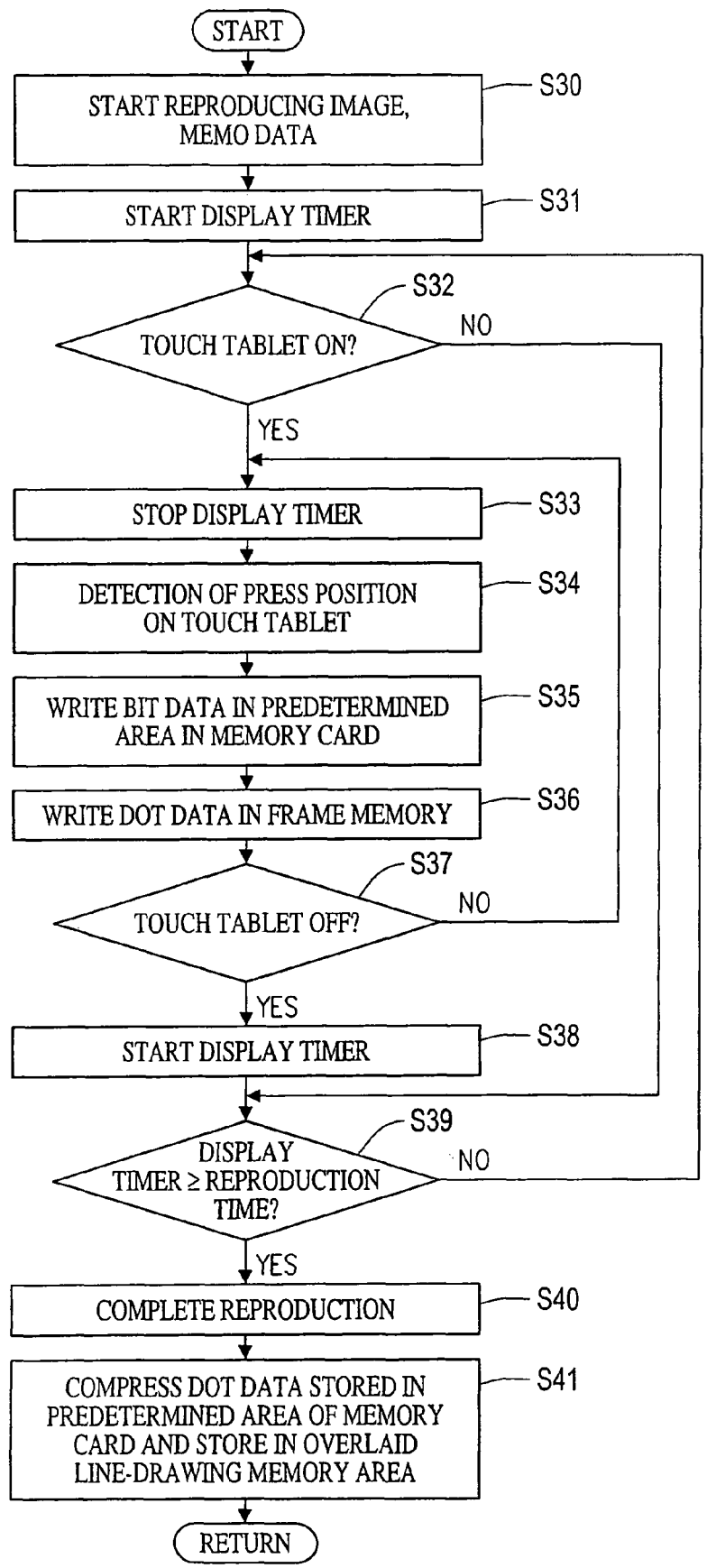
FIG. 13 is a flow chart showing an example of the process of presentation of FIG. 12.

FIG. 13 is a flow chart describing in detail the presentation process shown in FIG. 12.

Upon execution of this process, CPU 36, at step S30, begins reproducing image, sound or memo information set at the presentation mode setting screen (see FIG. 11). In other words, the data with the reproduction number "1" is read from the memory card 24 and is output to the speaker or LCD 6 and monitor 300 after execution of a predetermined conversion process according to the type of information being obtained.

Figure 14:
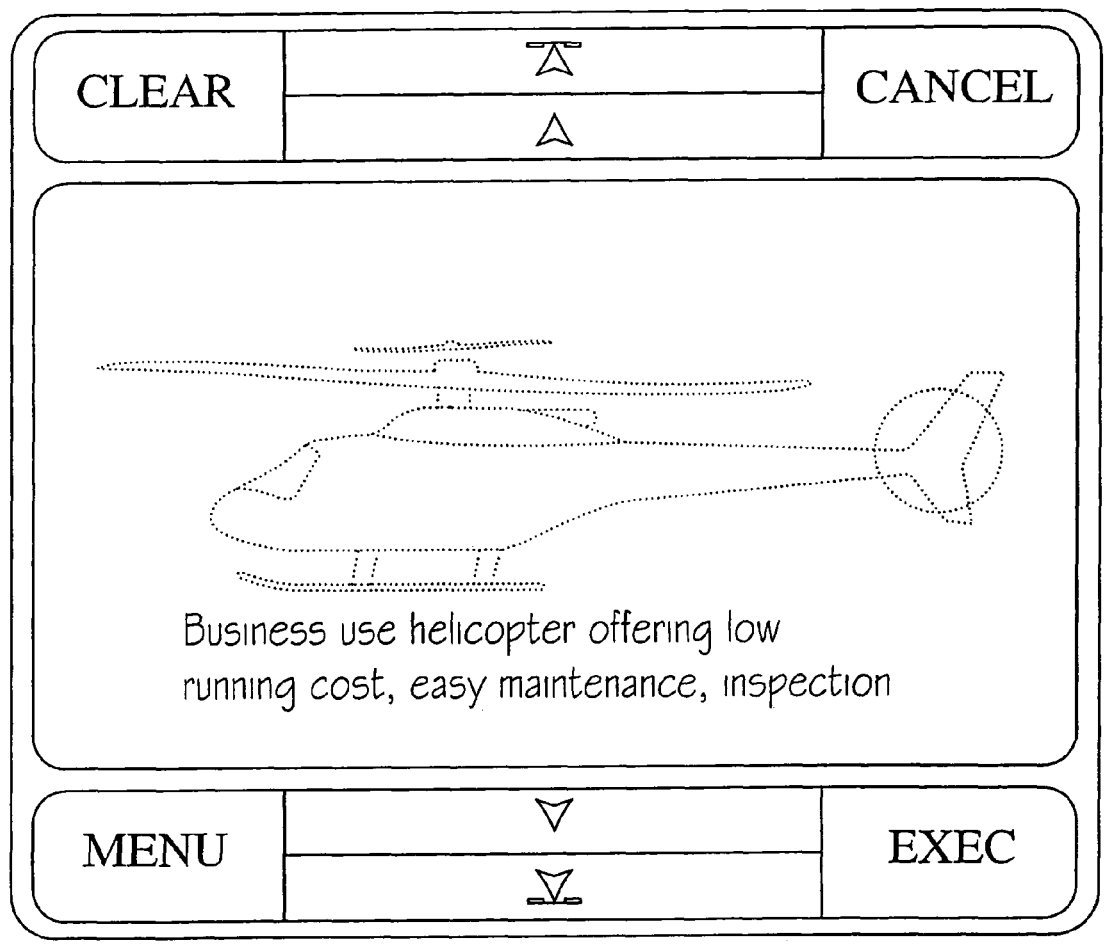
FIG. 14 is a view of the display screen showing an intermediate image to be displayed during presentation mode.

FIG. 14 shows a display example of the image at this time. The display example displays memo information (description of the shooting image) at the bottom of the shooting image (a helicopter).

Next, at step S31, the unrepresented display timer, which is installed inside CPU 36, starts counting. Then CPU 36 moves to step S32 where it determines whether the touch tablet 6A is pressed (turned on). As a result, if the touch tablet 6A is determined to have not been pressed (the user has not input to touch tablet 6A by the pen type pointing device 100 (NO)), CPU 36 moves to step S39, but if the touch tablet 6A is determined to have been pressed (YES), CPU 36 moves to step S33.

At step S33, the display timer temporarily stops counting. At step S34, CPU 36 detects the X-Y coordinate of the pressed position in the touch tablet 6A. The detected position data is stored in the buffer memory 35 and, at the same time, converted to bit data and is written in the position corresponding to an unrepresented work area in the memory card 24 at step S35. The bit data is also supplied to the frame memory 40 and a composition process is executed on the bit data with the image (shooting image or memo information) which is being displayed (step 536) thus writing dot data in the frame memory. As a result, the overlaid line-drawing information input by the pen type pointing device 100 is displayed being overlaid on the image already displayed on LCD 6.

When the shooting image is a moving image that is shot with L-mode or H-mode, the overlay process is executed separately on each of the frames that comprise the moving image, thus allowing writing to be executed for moving images.

When the reproduced image consists only of sound data, the image data that is displayed immediately before the sound data is displayed continuously until the reproduction of the sound data is completed.

Figure 15:
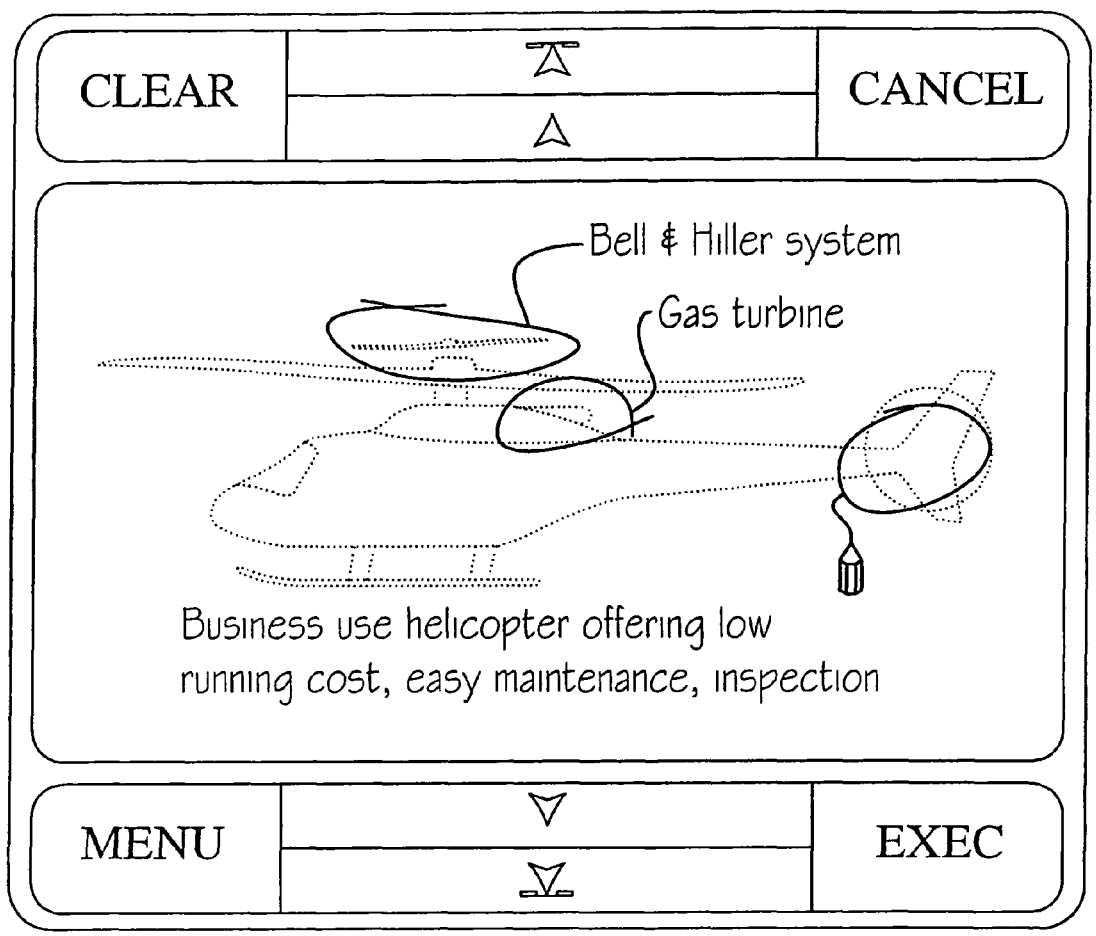
FIG. 15 shows an intermediate image when writing is executed on the display screen of FIG. 14.

FIG. 15 is a display example in which the user executed writing by the pen type pointing device 100 for the display example of FIG. 14. As shown in the figure, the overlaid line drawing information that the user input using the pen type pointing device 100 is displayed being overlaid on the image that is already displayed in FIG. 14. In the display example, supplementary information is written for each part of the displayed image (a helicopter).

Next, CPU 36 determines at step S37, whether the pen type pointing device 100 is removed from (turned off) the touch tablet 6A. As a result, if the pen type pointing device 100 is determined to be removed (YES), CPU 36 moves to step S38 and the display counter resumes counting. If the pen type pointing device 100 is determined not to be separated (it is still pressed on the touch tablet 6A (NO)), CPU 36 returns to the process of step S33 and repeats the same process. In other words, when the user is inputting with the pen type pointing device 100, the display timer temporarily stops counting and when the user interrupts input, the display counter resumes counting, thus preventing interruption of writing due to elapsing of reproduction time during writing.

Moreover, remaining reproduction time (time obtained by subtracting display timer value from the reproduction time or percentage (%) of the display time to the reproduction time) may be displayed on a part of the screen. By doing this, the user knows how long the display of each data lasts and is able to adjust the speaking speed according to the time remaining. If the user judges that the remaining time is running out, the user may be able to stop the counting of the display counter by pressing the pen type pointing device 100 on an appropriate position in the touch tablet 6A to make the reproduction time longer. If excess reproduction time remains, the user may move to reproduction of the next data by pressing the cancel key 7D, for example.

At step S39, CPU 36 determines whether the value of the display timer is larger than the reproduction time which is set in the presentation mode setting screen (see FIG. 11). As a result, if CPU 36 determines that the value of the display timer is smaller than the reproduction time (NO), CPU 36 returns to step S32 and repeats the same process. If CPU 36 determines that the value of the display timer is larger than or equal to the reproduction time (YES), CPU 36 moves to step S40 and completes the reproduction process.

At the following step S41, CPU 36 executes data compression based on the run length method on the bit data stored in the work area of the memory card 24, stores the compressed data in the overlaid line-drawing information area 63 (see FIG. 6) of the memory card 24, and returns to the original process (step S13 of FIG. 12). At step S13 of FIG. 12, CPU determines whether data to be reproduced exists. As a result, if the determination is affirmative (YES), CPU 36 returns to S10 to repeat the same process, and if the determination is that there is no data to be reproduced (NO), CPU 36 completes the processing (end). After completion of this process, CPU 36 again returns to the presentation mode setting screen or the playback setting mode.

Figure 16:
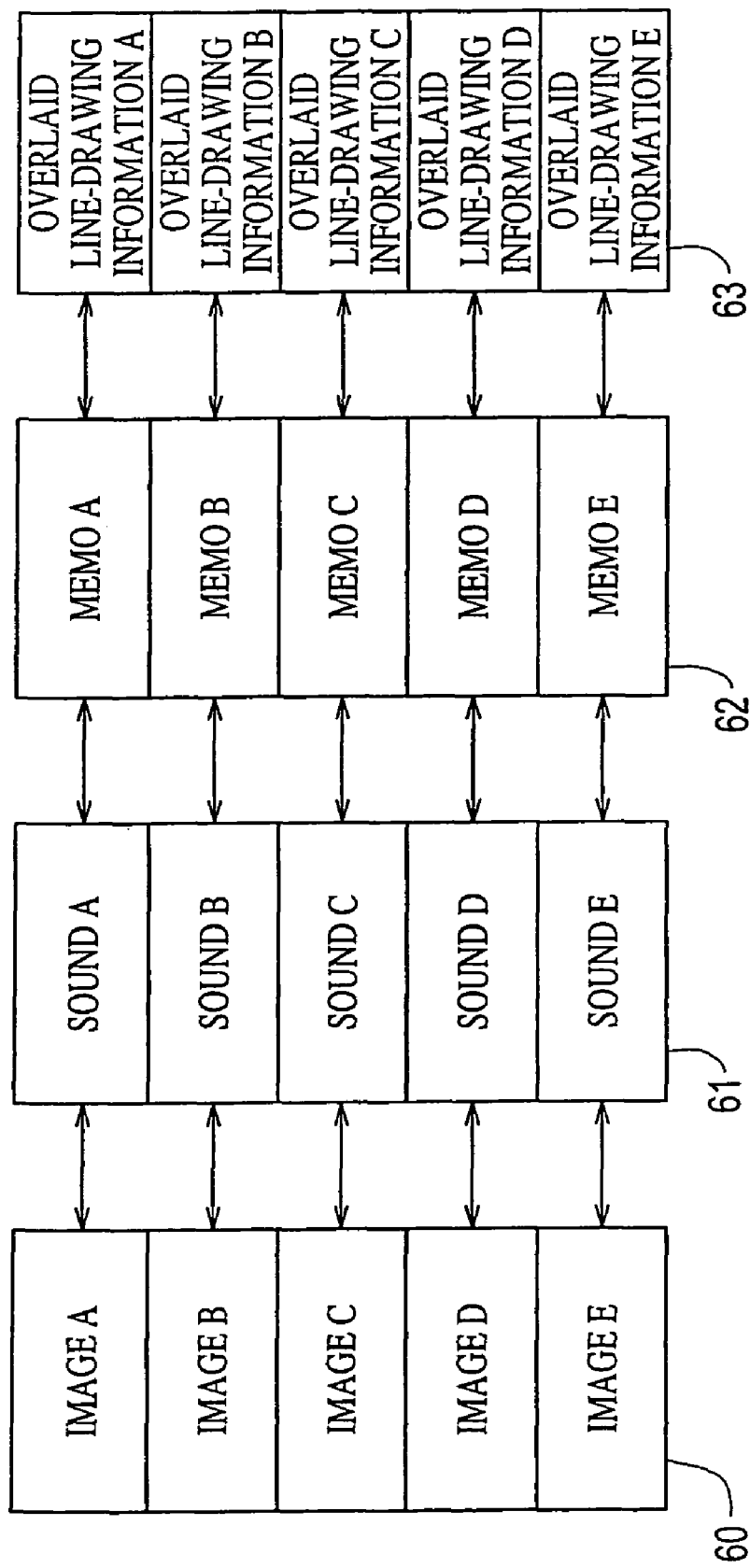
FIG. 16 is a diagram showing correspondence relationship of various data recorded on the memory card.

FIG. 16 is an example of a storage configuration when the overlaid line-drawing data is stored in the memory card 24. The overlaid line-drawing data is made to correspond to the shooting image, the sound or the memo information before being stored. For example, the overlaid line-drawing information A in FIG. 16 corresponds to the image A, the sound A and the memo A. In other words, FIG. 16 shows that the overlaid line-drawing information A is written when the image A, the sound A and the memo A are being reproduced. In FIG. 16, all three types of data for image, sound and memo are made to correspond to the overlaid line-drawing data, but as an example, if the overlaid line-drawing information is added only to the image, the sound area and the memo area are not secured or erase-protected in that case.

The overlaid line-drawing information symbol (○) shown in FIG. 9 indicates that the data to which the symbol is attached includes the overlaid line-drawing data. The symbol (○) may be displayed in the initial screen of the presentation mode shown in FIG. 10.

In the embodiment above, the types of the data and the time to reproduce each data are designated beforehand. When reproducing the designated data, in addition to still images, information such as moving images, sounds or memo information may be presented during presentation to an audience, for example. Moreover, because it is possible to write or overlay the overlaid line-drawing information to the image that is already displayed using the pen type pointing device 100, it is possible to point to part of the image during the presentation, which provides additional spontaneous information.

Next, a process to erase overlaid line-drawing data written during presentation mode will be described.

Figure 17:
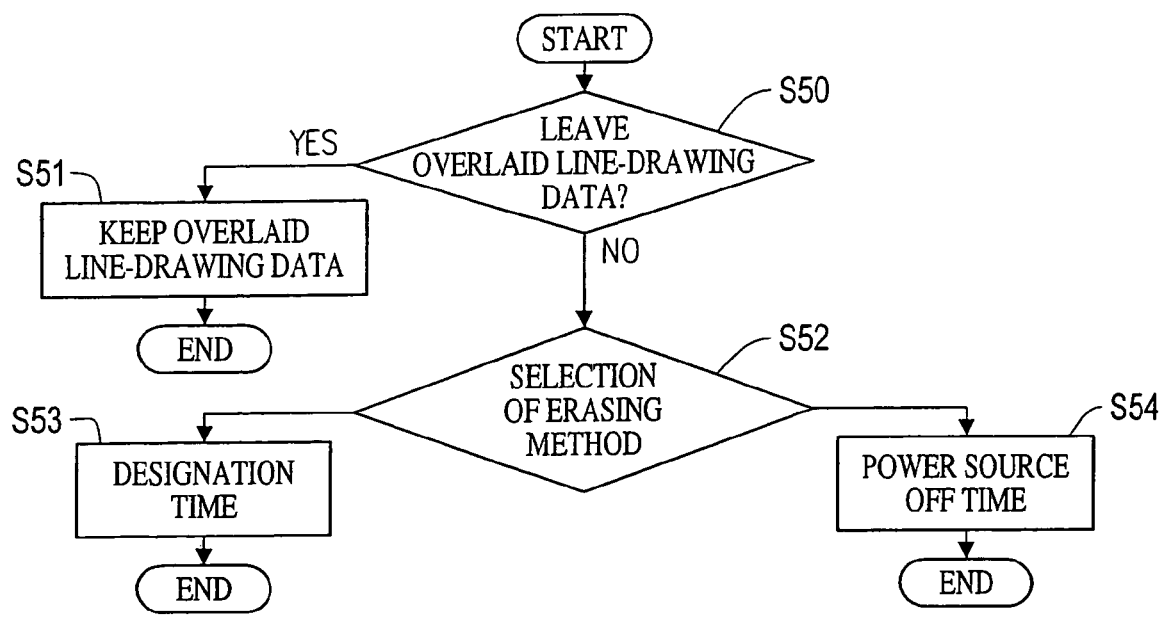
FIG. 17 is a flow chart showing an example of the process to designate an erasing method of the overlaid line-drawing data.

FIG. 17 is a flow chart showing the process related to erasing of the overlaid line-drawing data. This process is executed when the menu key 7A is operated and the command to execute erasing is designated.

Upon execution of this process, CPU 36 causes the user to select at step S50 whether to leave the overlaid line-drawing information. As a result, if the user selects the mode to leave the overlaid line-drawing information (YES), CPU 36 moves to S51, enabling the operation mode to keep all the overlaid line drawing information which has been input. In other words, if the overlaid line-drawing data is newly input, the overlaid line-drawing area 63 of memory card 24 is secured and the data being input is stored. If the remaining empty area of the memory card 24 becomes insufficient, CPU 36 prohibits further input of the overlaid line-drawing is data. In this mode, the overlaid line-drawing data cannot be erased, which prevents a user from accidentally erasing the data.

Figure 18:
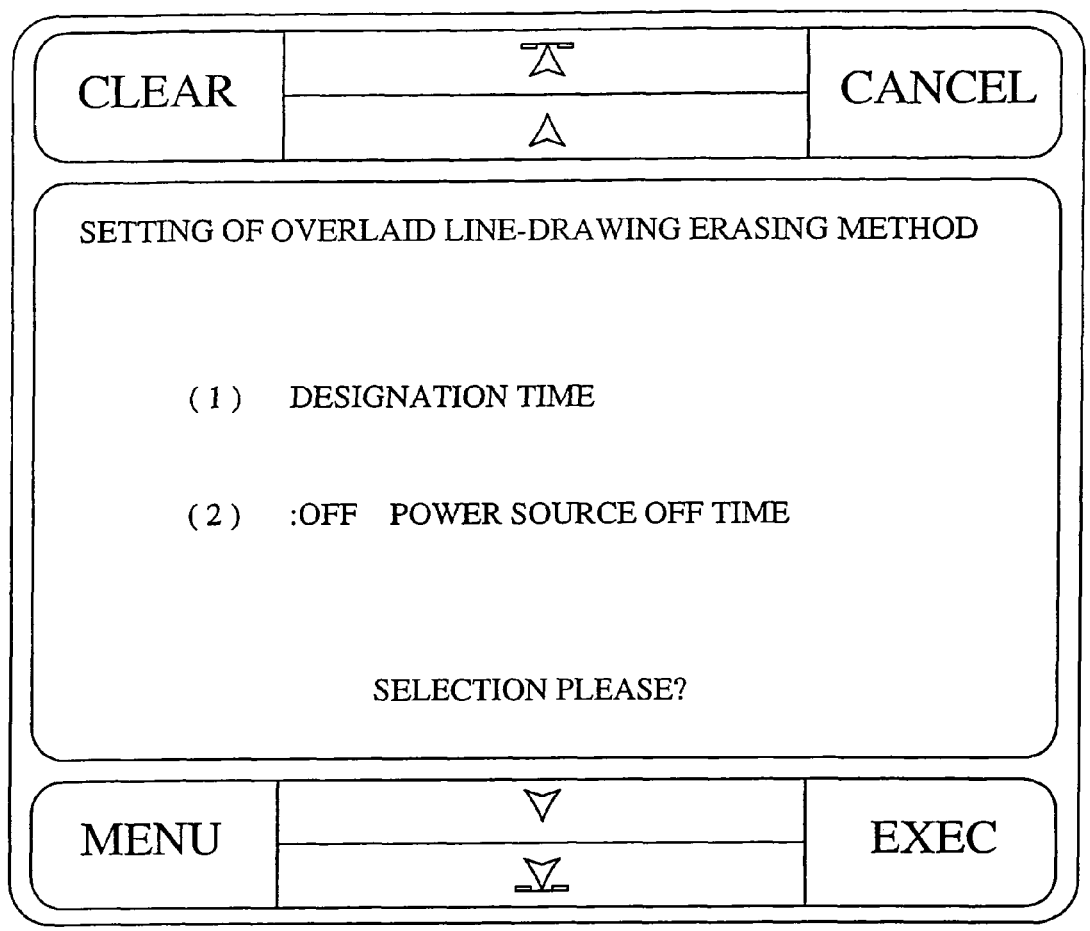
FIG. 18 is a diagram showing a display example of the screen to be displayed when the process of FIG. 17 is executed.
Figure 19:
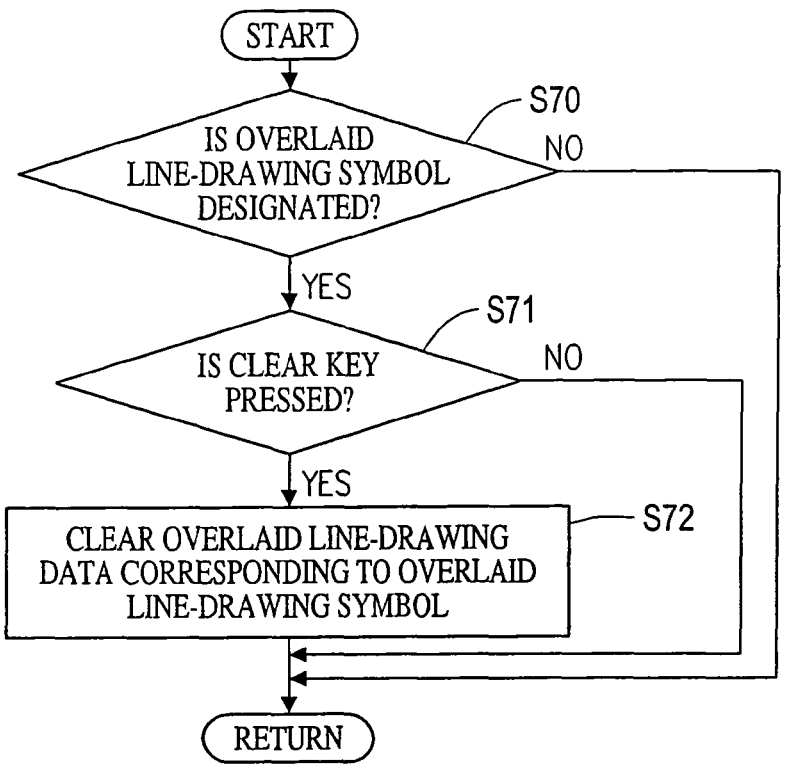
FIG. 19 is a flow chart showing an example of the process to clear the overlaid line-drawing data when the overlaid line-drawing symbol is designated.

At step S50, if the user selects a mode not to leave the overlaid line-drawing data (NO), CPU 36 moves to step S52. At step S52, CPU 36 executes a display, such as the one shown in FIG. 18, in LCD 6 and has the user select an erasing method. As a result, if the user selects the mode (1) to erase during the time of designation, CPU 36 moves to step S53. With the user's designation, a process to erase the overlaid line-drawing data is executed. The process to erase overlaid line-drawing data is described in FIG. 19.

This process is executed when the initial screen of the presentation mode (see FIG. 11) is displayed. Upon execution of this process, CPU 36 determines whether or not the specific overlaid line-drawing symbol is designated by the pen type pointing device 100. As a result, if the determination is made that the overlaid line-drawing symbol is not designated (NO), the process is completed (End), but if the determination is made that the overlaid line-drawing symbol is designated (YES), CPU 36 moves to step S71. Here, if the overlaid line-drawing symbol is designated, the designated symbol is clearly indicated by changing the display color of the symbol.

At step S71, a determination is made as to whether the clear key 7C is pressed by the pen type pointing device 100. As a result, if the clear key 7C is determined not to be pressed (NO), the process is completed (End), but if the clear key 7C is determined to be pressed YES), CPU 36 moves to step S72.

At step S72, the overlaid line-drawing data that is stored in the overlaid line-drawing area 63 of memory card 24 corresponding to the designated overlaid line-drawing symbol is cleared. Then the process is completed (End).

With such a process, the overlaid line-drawing information may be erased individually and with arbitrary timing.

Figure 20:
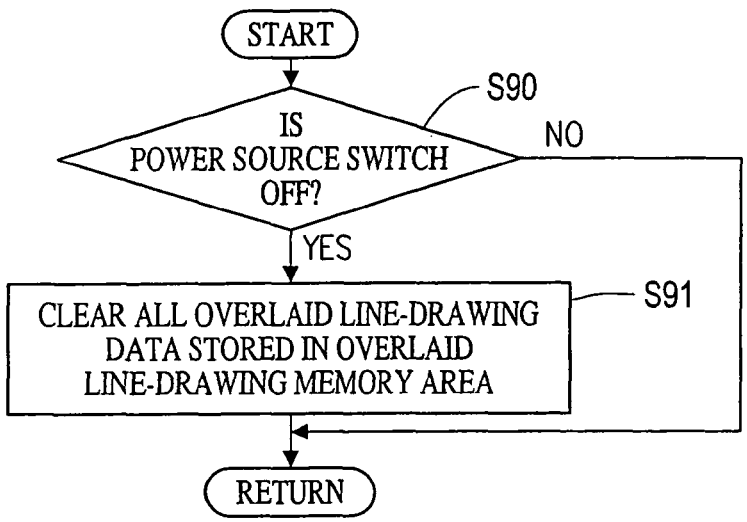
FIG. 20 is a flow chart showing an example of the process to clear the overlaid line-drawing data when the power source switch is turned off.
Figure 21:
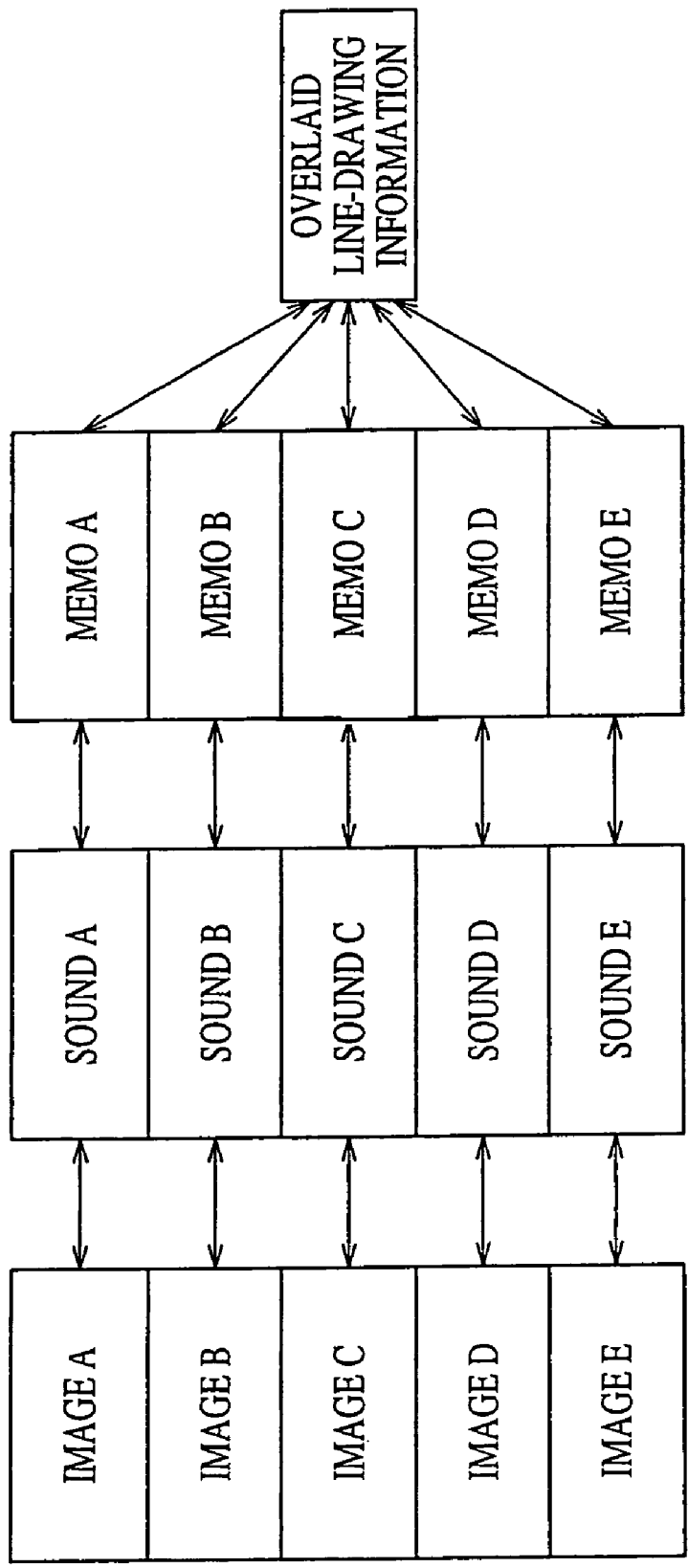
FIG. 21 is a diagram showing the correspondence relationship between various other data recorded in the memory card.

Returning to the explanation of FIG. 17, if the user selects the mode (2) to erase during OFF time of the power source, CPU 36 moves to step S54. Moreover, if the power switch 11 is turned off, a mode is set in which all the overlaid line-drawing data are erased. FIG. 20 is a flow chart describing an example of a process executed when the power switch 11 is placed in the OFF mode.

Because CPU 36 always runs with low electricity consumption, it is possible to execute the erasure process even when the power source switch 11 is in the OFF mode.

At step S90, CPU 36 determines whether the power source switch 11 is turned off. As a result, if the determination is made that the power source switch 11 is turned off (YES), CPU 36 moves to step S91, and if the determination is made that the power source switch 11 continues to be on (NO), the process is completed (End). Here, in order to determine whether the power switch 11 is in the OFF mode, a predetermined control command is supplied to DSP 33 or the sound IC 38, for example, to determine whether correct response is obtained.

At step S91, all the overlaid line-drawing data stored in the area 63 are cleared and the process is completed (End).

With the process described above, when a plurality of presentations are made using the same data, for example, all the overlaid line-drawing data are erased by turning the power source switch 11 off, hence, trouble of erasing overlaid line-drawing data after completion of each presentation is eliminated.

In the above described embodiments, all the overlaid line-drawing data input during presentation mode are made to be kept until the erasure process is performed. Alternatively, only overlaid line-drawing storage area 63 sufficient for one screen may be secured and the overlaid line-drawing data that are input at a previous screen may be cleared each time the display screen is changed (each time new image data is displayed). With such structure, necessary memory capacity can be made small because only the overlaid line-drawing memory area 63 sufficient for one screen of information needs to be secured.

In the illustrated embodiment, the camera controller is implemented as a single special purpose integrated circuit (e.g., ASIC) having a main or central processor section for overall, system-level control, and separate sections dedicated to performing various different specific commutations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 12, 13, 17, 19 and 20 can be used as the controller. As shown, a distributed processing architecture is preferred for maximum data/signal processing capability and speed.

As noted earlier, the memory can be a separate, detachable memory card 24 or can be built into the electronic camera. The various memory areas identified in, e.g., FIG. 6 can be separate memory devices or portions of a single memory that is partitioned into the various areas.

Although the illustrated input device included a touch tablet and pen-type pointing device, other suitable input devices also can be used.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An information processing apparatus comprising:
a first memory area in which image information is stored;
an order setting device that sets a reproduction order of the image information that is to be reproduced;
a time setting device that sets a reproduction time of the image information that is to be reproduced;
an input device by which line-drawing information is input;
a second memory area in which said line-drawing information input with said input device is stored;
a controller that reproduces the image information from the first memory area based on the reproduction order and the reproduction time and overlays said line-drawing information, inputted during reproduction of said image information by said input device, and said image information to produce an image signal; and
an output by which said image signal is output from said information processing apparatus, wherein
said controller suspends a time count of said reproduction time when an input of said line-drawing information by said input device is performed during reproduction of said image information.

2. The information processing apparatus according to claim 1, further comprising:
a third memory area in which text information is stored, and wherein
said controller overlays said line-drawing information, said image information and said text information.

3. The information processing apparatus according to claim 2, wherein said controller includes an erasing mode in which said line-drawing information stored in said second memory area is erased without erasing said image information stored in said first memory area or said text information stored in said third memory area.

4. The information processing apparatus according to claim 1, wherein said controller includes an erasing mode in which said line-drawing information stored in said second memory area is erased without erasing said image information stored in said first memory area.

5. The information processing apparatus according to claim 1, wherein:
said input device includes a pen type pointing device and a touch tablet.

6. The information processing apparatus according to claim 5, further comprising a display device on said information processing apparatus, and wherein:
said controller displays said image information as a plurality of thumbnail images on said display device, and
said controller displays an overlaid line-drawing information symbol on said display device adjacent one of said thumbnail images when said controller has overlaid said line-drawing information with a portion of said image information represented by said one of said thumbnail images.

7. The information processing apparatus according to claim 1, wherein said first memory area and said second memory area are provided on a memory card that is detachably connected to said information processing apparatus.

8. The information processing apparatus according to claim 1, wherein said first memory area and said second memory area are distinct portions of a single, partitioned memory.

9. The information processing apparatus according to claim 1, wherein said information processing apparatus is an electronic camera having a shooting lens and an image conversion device that converts a light image to electronic images, said electronic images being stored in said first memory area as said image information.

10. The information processing apparatus according to claim 1, wherein said output includes an output jack.

11. The information processing apparatus according to claim 1, further comprising a frame memory, and wherein said controller overlays said line-drawing information and said reproduced image information in said frame memory.

12. An information processing apparatus comprising:
first memory means for storing image information;
order setting means for setting a reproduction order of the image information that is to be reproduced;
time setting means for setting a reproduction time of the image information that is to be reproduced;
reproduction means for reproducing said image information stored in said first memory means based on the reproduction order and the reproduction time;
input means for inputting line-drawing information;
second memory means for storing said line-drawing information input with said input means;
overlay means for overlaying said line-drawing information, inputted during reproduction of said image information by said input means, and said image information reproduced by said reproduction means; and
output means for outputting an image signal produced by said overlay means, wherein
the reproduction means suspends a time count of said reproduction time when an input of said line-drawing information by said input means is performed during reproduction of said image information.

13. The information processing apparatus according to claim 12, further comprising:
third memory means for storing text information, and wherein
said overlay means overlays said line-drawing information, said image information and said text information.

14. The information processing apparatus according to claim 13, further including:
erasing means for erasing said line-drawing information stored in said second memory means without erasing said image information stored in said first memory means or said text information stored in said third memory means.

15. The information processing apparatus according to claim 12, further including:
erasing means for erasing said line-drawing information stored in said second memory means without erasing said image information stored in said first memory means.

16. The information processing apparatus according to claim 12, wherein:
said input means includes a pen type pointing device and a touch tablet.

17. The information processing apparatus according to claim 16, further comprising display means on said information processing apparatus, and wherein:
said image information is represented as a plurality of thumbnail images on said display means, and
an overlaid line-drawing information symbol is displayed on said display means adjacent one of said thumbnail images when said overlay means has overlaid said line-drawing information with a portion of said image information represented by said one of said thumbnail images.

18. A method of processing information with an information processing apparatus, said method including the steps of:
storing image information in a first memory area;
setting a reproduction order of the image information that is to be reproduced;
setting a reproduction time of the image information that is to be reproduced;
reproducing said image information stored in said first memory area based on the reproduction order and the reproduction time;
inputting line-drawing information;
storing said line-drawing information in a second memory area;
overlaying said line-drawing information, inputted during reproduction, with said image information;
outputting an image signal comprising said image information overlaid with said line-drawing information; and
suspending a time count of said reproduction time when an input of said line-drawing information is performed during reproduction of said image information.

19. The method according to claim 18, further including the step of:
erasing said line-drawing information overlaid on said image information without affecting said image information.

20. The method according to claim 18, further including the steps of:
storing text information in a third memory area, and
overlaying said line-drawing information with said image information and said text information.

21. The method according to claim 20, further including the step of:

erasing said line-drawing information overlaid on said image information and said text information without affecting said image information or said text information.

22. The method according to claim 18, wherein said method is performed in an electronic camera, and said image information stored in said first memory area originating from a shooting lens of said electronic camera.

* * * * *